US011888775B2

(12) United States Patent
Li et al.

(10) Patent No.: US 11,888,775 B2
(45) Date of Patent: Jan. 30, 2024

(54) TIME AND FREQUENCY TRACKING REFERENCE SIGNALS IN NEW RADIO

(71) Applicant: InterDigital Patent Holdings, Inc, Wilmington, DE (US)

(72) Inventors: Yifan Li, Conshohocken, PA (US); Lakshmi R. Iyer, King of Prussia, PA (US); Joseph M. Murray, Schwenksville, PA (US); Allan Y. Tsai, Boonton, NJ (US); Guodong Zhang, Woodbury, NY (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 44 days.

(21) Appl. No.: 17/847,644

(22) Filed: Jun. 23, 2022

(65) Prior Publication Data

US 2022/0416972 A1    Dec. 29, 2022

Related U.S. Application Data

(63) Continuation of application No. 16/650,892, filed as application No. PCT/US2018/053462 on Sep. 28, 2018, now abandoned.
(Continued)

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0023* (2013.01); *H04L 27/2613* (2013.01);
(Continued)

(58) Field of Classification Search
CPC ... H04L 5/0051; H04L 5/0023; H04L 5/0048; H04L 27/2613; H04W 72/0446; H04W 72/2613; H04W 72/23; H04W 16/14
(Continued)

(56) References Cited

U.S. PATENT DOCUMENTS

2013/0114535 A1    5/2013  Ng et al.
2014/0315443 A1   10/2014  Lin
(Continued)

FOREIGN PATENT DOCUMENTS

CN          104144488 A       11/2014

OTHER PUBLICATIONS

3GPP TSG RAN WG1 Meeting #90, "RAN1 Chairman's Notes", Aug. 2017, 143 pages.
3GPP TSG RAN WG1 Meeting AH NR#3 R1-1715470, Huawei, HiSilicon, "Multiplexing Different Types of RSs for DL and UL", Sep. 2017, 7 pages.
(Continued)

*Primary Examiner* — Peter G Solinsky
(74) *Attorney, Agent, or Firm* — BakerHostetler

(57) ABSTRACT

In NR, a slot structure of a UE may be dynamic due the number of symbols of PDCCH and whether the slot has UL data, among other considerations. Additionally, to support multi-TRP/multi-panel/multi-BWP operation, a UE may be configured with multiple TRSs, and when a UE needs to receive multiple TRSs in the same slot, efficient signaling of the TRSs is important because of the high overhead involved. During a transmission, a UE may need to do beam switching when there is a beam failure, but existing systems do not have mechanisms for the UE to synchronize time and frequency with a new beam. Further, when a UE switches to a new beam, the effect on scheduled TRS transmission for old beams is unclear. Fine frequency and time tracking may also be required during an initial access procedure. Existing NR systems do not address how a UE may perform time and frequency tracking during an initial access procedure. Addi-
(Continued)

tionally, URLLC data may need to be transmitted to a UE immediately in an NR system. Existing NR systems do not address sending a TRS to a UE with URLLC data. Embodiments described herein address these and other issues.

17 Claims, 31 Drawing Sheets

Related U.S. Application Data

(60) Provisional application No. 62/565,829, filed on Sep. 29, 2017.

(51) Int. Cl.
*H04W 16/14* (2009.01)
*H04W 72/0446* (2023.01)
*H04W 72/23* (2023.01)

(52) U.S. Cl.
CPC ....... *H04W 16/14* (2013.01); *H04W 72/0446* (2013.01); *H04W 72/23* (2023.01); *H04L 5/0051* (2013.01)

(58) Field of Classification Search
USPC .......................................................... 370/329
See application file for complete search history.

(56) References Cited

U.S. PATENT DOCUMENTS

| | | |
|---|---|---|
| 2015/0003356 A1 | 1/2015 | Seo et al. |
| 2015/0030037 A1 | 1/2015 | Ahn et al. |
| 2015/0139113 A1 | 5/2015 | You et al. |
| 2015/0349940 A1 | 12/2015 | Kim et al. |
| 2019/0053321 A1 | 2/2019 | Islam et al. |
| 2019/0109747 A1 | 4/2019 | Hessler et al. |
| 2019/0165880 A1* | 5/2019 | Hakola ................. H04L 1/1854 |
| 2019/0356463 A1* | 11/2019 | Zhang .................. H04W 76/27 |

OTHER PUBLICATIONS

3GPP TSG RAN WG1 Meeting NR#3 R1-1716655, CATR, "Consideration on the TRS Design for NR", Sep. 2017, 4 pages.
3GPP TSG RAN WG1 Meeting NR#3, "RAN1 Chairman's Notes", Sep. 2017, 63 pages.
3GPP TSG RAN WG1 Meeting NR-AH#3 R1-1715965, Samsung, "Discussions on DL/UL RS Multiplexing", Sep. 2017, 6 pages.
3GPP TSG RAN WG1 NR Ad-Hoc#2 "RAN1 Chairman's Notes", Jun. 2017, 77 pages.
3GPP TSG RAN WG1 NR AdHoc#3 R1-1716409, Qualcomm Incorporated, "Reamining Open Issues on TRS" Sep. 2017, 4 pages.
CATR: "Consideration on the TRS design for NR", 3GPP Draft; R1-1716655, 3rd Generation Partnership Project (3GPP), Mobile Competence Centre ; 650, Route Des Lucioles ; F-06921 Sophia-Antipolis Cedex ; France, vol. RAN WG1, no. Nagoya, Japan; Sep. 18, 2017-Sep. 21, 2017 Sep. 17, 2017 (Sep. 17, 2017), XP051340105.
Huawei et al.: "Multiplexing different types of RSs for DL and UL", 3GPP Draft; R1-1715470, 3rd Generation Partnership Project (3GPP), Mobile Competence Centre ; 650, Route Des Lucioles ; F-06921 Sophia-Antipolis Cedex ; France, vol. RAN WG1, no. Nagoya, Japan; Sep. 18, 2017-Sep. 21, 2017 Sep. 17, 2017 (Sep. 17, 2017), XP051338938.
Samsung: "Discussions on DL/UL RS multiplexing", 3GPP Draft; R1-1715965 DL and UL RS MUX, 3rd Generation Partnership Project (3GPP), Mobile Competence Centre ; 650, Route Des Lucioles ; F-06921 Sophia-Antipolis Cedex ; France, vol. RAN WG1, no. Nagoya, Japan; Sep. 18, 2017-Sep. 21, 2017 Sep. 17, 2017 (Sep. 17, 2017), XP051339424.
Qualcomm Incorporated: "Remaining open issues on TRS", 3GPP Draft; R1-1716409_TRS Open Issues, 3rd Generation Partnership Project (3GPP), Mobile Competence Centre ; 650, Rout: Des Lucioles ; F-06921 Sophia-Antipolis Cedex ; France, vol. RAN WG1, no. Nagoya, Japan; Sep. 18, 2017-Sep. 21, 2017 Sep. 17, 2017 (Sep. 17, 2017), XPO51339864, Retrieved from the Internet: URL:http://www.3gpp.org/ftp/Meetings_3GPP_SYNC/RAN1/Docs/ [retrieved on Sep. 17, 2017].

* cited by examiner

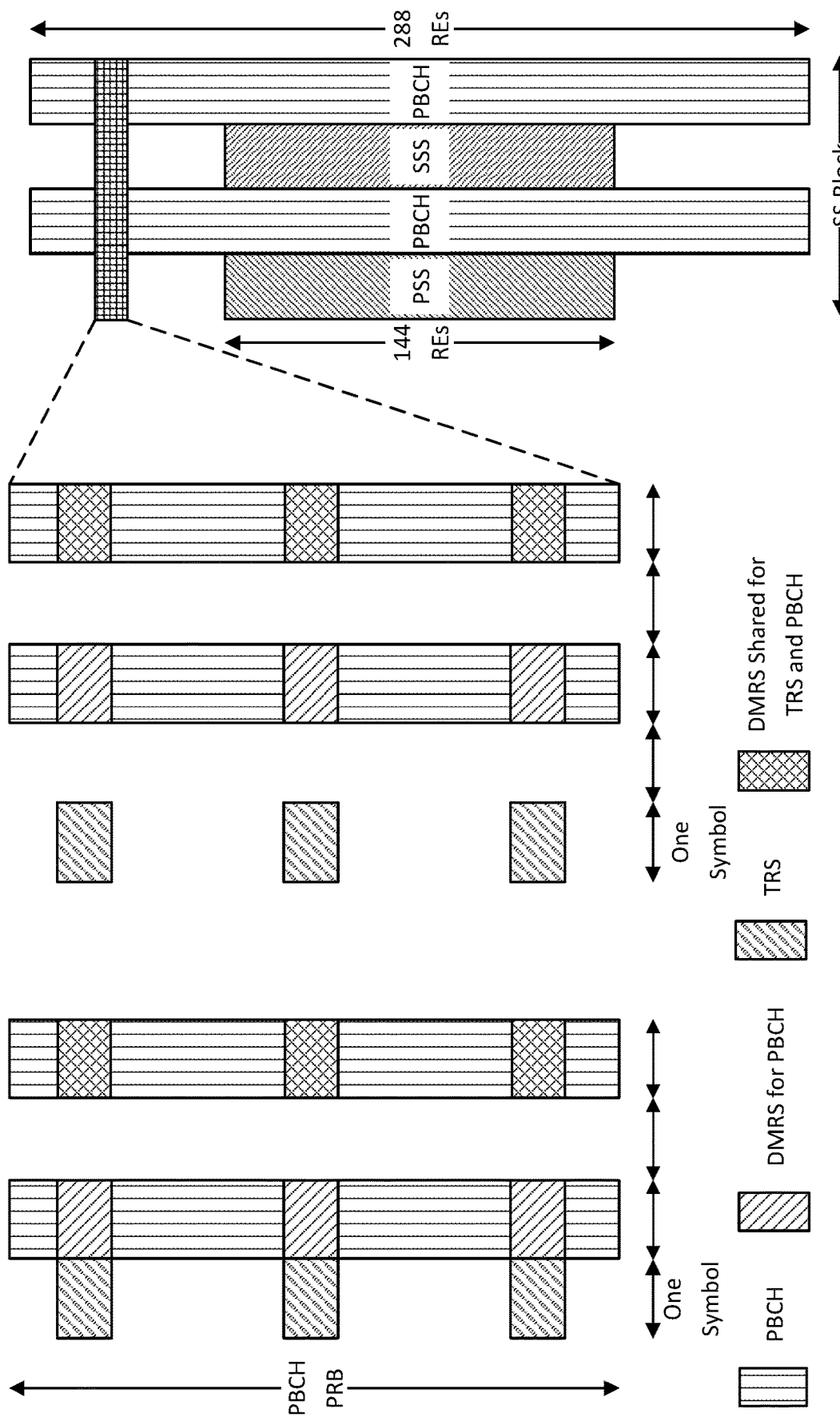

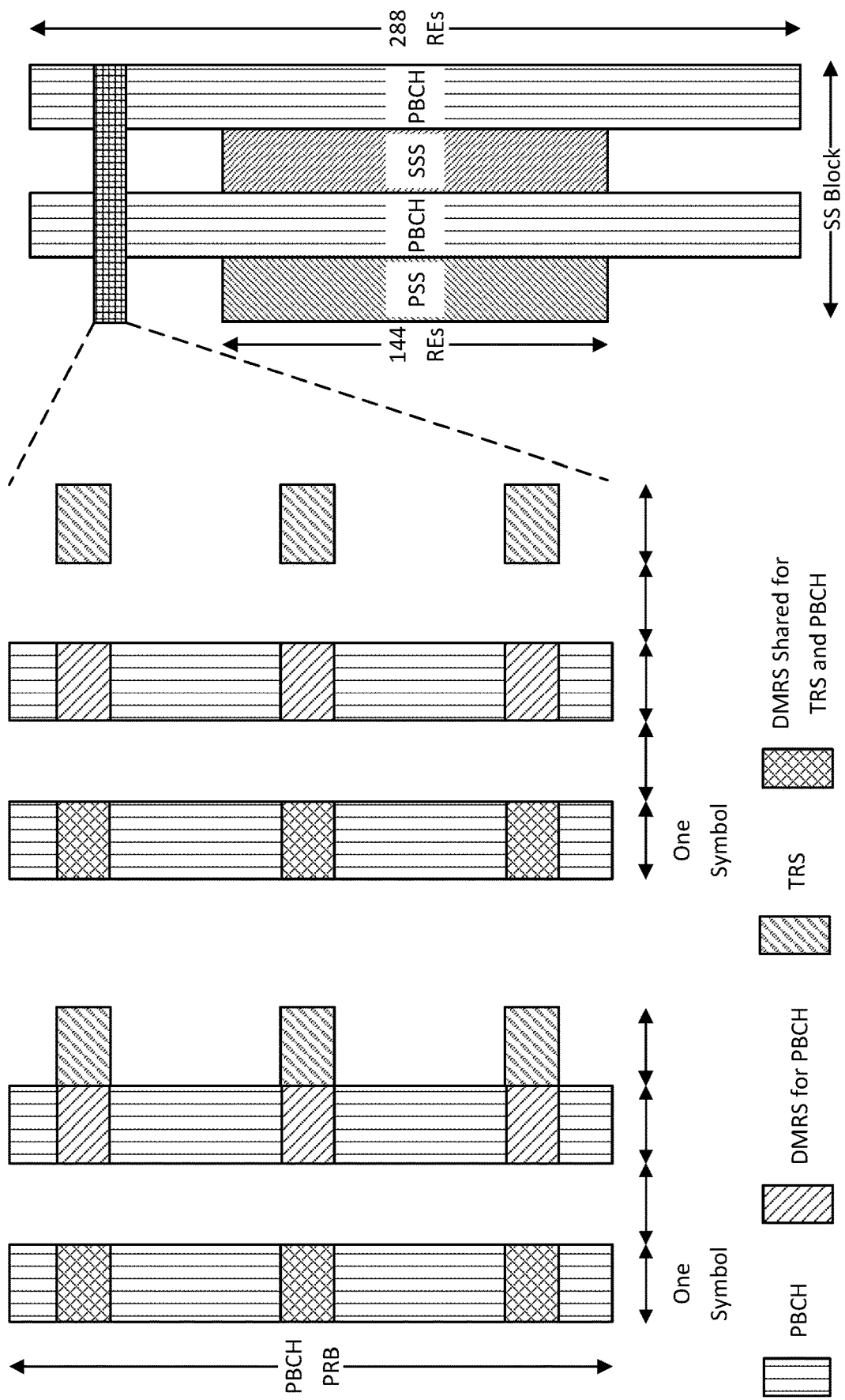

TIME AND FREQUENCY TRACKING REFERENCE SIGNALS IN NEW RADIO

CROSS-REFERENCE TO RELATED APPLICATIONS

This application is a continuation of U.S. patent application Ser. No. 16/650,892 filed Mar. 26, 2021 which is the National Stage Application of International Patent Application No. PCT/US2018/053462 filed Sep. 28, 2018, which claims the benefit of U.S. Provisional Application No. 62/565,829 filed on Sep. 29, 2017, entitled "Time and Frequency Tracking Reference Signals in New Radio", the contents of which are hereby incorporated by reference in their entirety.

BACKGROUND

This disclosure pertains to new radio communications technologies, such as those described, for example, in the 3GPP TR 38.913 Study on Scenarios and Requirements for Next Generation Access Technologies.

SUMMARY

In new radio (NR), a Tracking Reference Signal (TRS) that is specific to a user equipment (UE) may be configured for the UE in RRC connected mode. A slot structure of the UE may be dynamic due the number of symbols of PDCCH and whether the slot has UL data, among other considerations. A detailed design of a TRS pattern for different slot structures should be defined. A TRS may be transmitted periodically in NR, wherein the slots containing the TRS burst may have different slot structures that may affect the configuration of the TRS pattern. Therefore, a mechanism may be introduced for TRS signaling and transmission for different slot structures. Methods and devices are described herein that use a slot structure-based TRS pattern design to support the dynamic slot structure on TRS scheduling, and enable a TRS structure design for one slot TRS burst, and enable a mechanism for slot and non-slot structure-based TRS configuration signaling.

To support multi-TRP/multi-panel/multi-BWP operation, a UE may be configured with multiple TRSs. When a UE needs to receive multiple TRSs in the same slot, efficient signaling of the TRSs is important because of the high overhead involved. In the transmission, a UE may need to do beam switching when there is a beam failure, but existing systems do not have mechanisms for the UE to synchronize time and frequency with a new beam. Further, when a UE switches to a new beam, the effect on scheduled TRS transmission for old beams should be clarified. For example, assume a UE is monitoring beam 1 and beam 2, which are QCL-ed initially, and the TRS is transmitted only on beam 1 to reduce overhead. Then, the UE switches from beam 1 to beam 3, which is not QCL-ed with beam 2. In such a case, a gNB should update/re-schedule the TRS transmission for beam 2 and beam 3. Methods and devices are described herein that enable mechanisms of TRS signaling for multi-TRP/multi-panel/multi-BWP scenarios and that enable mechanisms for updating a TRS configuration when a UE switches to a new TRP or BWP.

A predetermined signal may be transmitted on a Physical Downlink Channel (PDCH) comprising at least a first slot, and transmitting a Time/frequency tracking Reference Signal (TRS) in the first slot of the PDCH such that the TRS and predetermined signal do not overlap. The first slot may comprise a plurality of symbols. The predetermined signal may be transmitted in a first subset of the plurality of symbols, and the TRS may be transmitted in a second subset of the plurality of symbols. The first subset and the second subset may overlap, or may not overlap. The TRS may be transmitted beginning at a fixed symbol location. The predetermined signal may be a Control Resource Set (CORESET), a Demodulation Reference Signal (DMRS), or a Synchronization Signal (SS). The TRS may be transmitted periodically.

A Physical Broadcast Channel (PBCH) may be transmitted comprising at least a first slot, a first Synchronization Signal (SS) block and a first Time/frequency tracking Reference Signal (TRS) associated with the first SS block, and later in the first slot, a second SS block and a second TRS associated with the second SS block. The first SS block and the first TRS may be Quasi Co-Located (QCL-ed), and the second SS block and the second TRS may be QCL-ed. The first SS block and the first TRS may be Time-Division Multiplexed (TDM-ed) or Frequency-Division Multiplexed (FDM-ed).

In LTE, when a UE wakes up from Discontinuous Reception (DRX), the UE may lose the time and frequency tracking. To solve this, the UE may wake up several slots early to get time and frequency synchronized using the always-on reference signal CRS. In NR, CRS is not supported in order to reduce overhead and power consumption. Existing NR systems do not address how a UE may perform the time and frequency tracking to get synchronized when the DRX ON duration starts. Note that the DRX ON duration may refer to the moment the UE wakes up from the DRX and starts monitoring the PDCCH or determining if there is a grant of paging occasion for it. Methods and devices are herein that enable mechanisms for time and frequency tracking for DRX.

Fine frequency and time tracking may also be required during an initial access procedure. The Remain Minimum System Information (RMSI) and Random Access Response (RAR) may be transmitted on PDSCH, which may be modulated with high quadrature amplitude modulation (QAM), for example, 16 QAM or more. Accurate time and frequency tracking may be required for demodulation and data reception where coarse frequency tracking acquired from an SS block is not enough. Existing NR systems do not address how a UE may perform the time and frequency tracking during an initial access procedure. Methods and devices are described herein that enable mechanisms for time and frequency tracking for RAR and on demand RMSI triggered by the Random Access preamble and on demand RMSI request, and that enable mechanisms for time and frequency tracking for broadcast RMSI triggered by PDCCH scrambled with SI-RNTI.

Methods are described that comprise receiving, from a first node, a Random Access Channel (RACH) preamble, then transmitting, to the first node, a Time/frequency tracking Reference Signal (TRS). Such methods may further comprise transmitting, to the first node, a Random Access Response (RAR) message and deactivating transmission of the TRS. The first node may be a UE.

In NR, URLLC data may need to be transmitted to a UE immediately in some cases. The targeted UE may not be able to receive the URLLC data at that moment because the UE may not have fine time and frequency synchronization with a serving cell. Additionally, the URLLC data may be transmitted in few symbols, which may not be enough to schedule a self-contained TRS. Existing NR systems do not address sending a TRS to a UE with URLLC data. Embodiments described herein may enable mechanisms for time and frequency tracking of URLLC.

Embodiments described herein may comprise transmitting, to a first node using lower QAM, Ultra-Reliable and Low Latency Communications (URLLC) data, and transmitting, to the first node, a Time/frequency tracking Reference Signal (TRS) during transmission of the URLLC data. The first node may be a UE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings.

FIGS. 8A-D illustrate examples of joint time and frequency tracking through TRS and shared DMRS for PBCH.

DETAILED DESCRIPTION

Figure 1A:
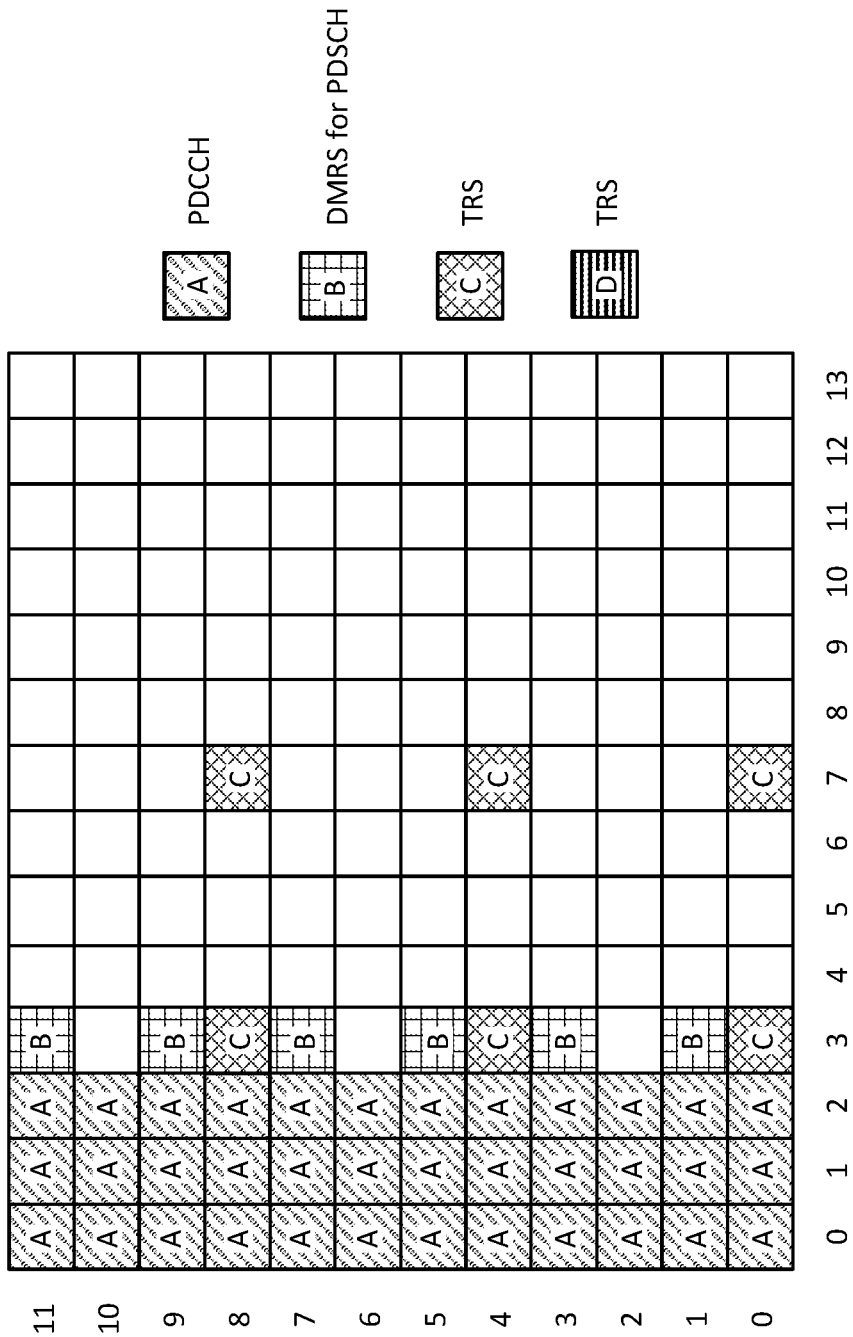
FIG. 1A illustrates an example of TRS RE interleaved with DMRS for PDSCH in the front loaded DMRS region with DMRS density D=½.

In NR, a slot structure of a UE may be dynamic due the number of symbols of PDCCH and whether the slot has UL data, among other considerations. Additionally, to support multi-TRP/multi-panel/multi-BWP operation, a UE may be configured with multiple TRSs, and when a UE needs to receive multiple TRSs in the same slot, efficient signaling of the TRSs is important because of the high overhead involved. During a transmission, a UE may need to do beam switching when there is a beam failure, but existing systems do not have mechanisms for the UE to synchronize time and frequency with a new beam. Further, when a UE switches to a new beam, the effect on scheduled TRS transmission for old beams is unclear. Fine frequency and time tracking may also be required during an initial access procedure. Existing NR systems do not address how a UE may perform time and frequency tracking during an initial access procedure. Additionally, URLLC data may need to be transmitted to a UE immediately in an NR system. Existing NR systems do not address sending a TRS to a UE with URLLC data. Embodiments described herein address these and other issues.

{recap tbd}

Table 1 of the Appendix is a list of acronyms relating to service level technologies. Unless otherwise specified, the acronyms used herein refer to the corresponding term listed in Table 1 below.

International Mobile Telecommunications (IMT) for 2020 and beyond (for example, IMT 2020) is envisaged to expand and support diverse families of usage scenarios and applications that will continue beyond the current IMT. Furthermore, a broad variety of capabilities may be tightly coupled with these different usage scenarios. Example families of usage scenarios include enhanced Mobile Broadband (eMBB), Ultra-Reliable and Low Latency Communications (URLLC), and massive Machine Type Communications (mMTC). These usage scenarios may have diverse and conflicting service requirements with regard to latency, data rates, mobility, device diversity, reliability, UE battery life, network energy consumption, and other characteristics. In light of these diverse and conflicting service requirements that the next generation international mobile telecommunication system must support, 3GPP has identified a set of system architecture requirements.

Example Key Performance Indicators (KPIs) defined by 3GPP for eMBB, URLLC, and mMTC devices are summarized in Table 2 of the Appendix.

In cellular communications, a UE may rely on accurate time and frequency tracking to guarantee demodulation of a received control channel and data. In LTE, the time and frequency tracking may be considered as two procedures: coarse tracking and fine tracking.

In an initial access procedure, a UE may achieve coarse time and frequency tracking through detecting the synchronization signal, for example, Primary synchronization signals (PSS) and secondary synchronization signals (SSS). The always on cell-specific reference signal (CRS) may be transmitted in each slot regardless of the presence and non-presence of the data. One of the functionalities of the CRS may be to provide reference signals for the UE to perform fine time and frequency tracking in both idle mode and connected mode. When a UE is in DRX mode, the UE may lose synchronization after sleeping. To solve this problem, depending on the UE capability, the UE may wake up several slots before the DRX ON duration to get re-synchronized with the time and frequency through using the always-on reference signal CRS.

In NR, the always-on signals such as CRS will not be supported because they introduce large overhead and cause unnecessary power consumption. Therefore, reference signals should be introduced/reused for the fine time and frequency tracking purpose, denoted as TRS.

In 5G NR, the following aspects of the TRS in NR have been discussed: a demodulation RS for common control resource set or common control search space together with extension in time domain; a CSI-RS for considering the enhanced type in both time and frequency domain; a dedicated RS; a DMRS for PBCH; an MRS; a PT-RS; and a PSS/SSS. Note that more than one RS may serve tracking for time and frequency.

It has been agreed that a TRS should have the following attributes. A TRS structure may include a burst structure and a TRS structure inside a burst. Existing RS(s), revisions of existing RS(s), or new RS(s) may be used in the TRS structure. TRS may support at least a single port. TRS may have equal RE spacing in frequency domain within a TRS bandwidth, and more than one equal RE spacing may be used. TRS may be UE-specifically managed. NR may support TRS for multi-TRP transmission.

In NR, a UE specific TRS may need to be configured to the UE in RRC connected mode. A slot structure of the UE may be dynamic due the number of symbols of PDCCH and whether the slot has UL data, among other considerations. Therefore, a detailed design of a TRS pattern for different slot structures should be defined. A TRS may be transmitted periodically in NR, wherein the slots containing the TRS burst may have different slot structures that may affect the configuration of the TRS pattern. To support multi-TRP/multi-panel/multi-BWP operation, a UE may be configured with multiple TRSs, and when a UE needs to receive multiple TRSs in the same slot, efficient signaling of the TRSs is important because of the high overhead involved. In the transmission, a UE may need to do beam switching when there is a beam failure, but existing systems do not have mechanisms for the UE to synchronize time and frequency with a new beam. Further, when a UE switches to a new beam, the effect on scheduled TRS transmission for old beams should be clarified. CRS is not supported in NR in order to reduce overhead and power consumption. Existing NR systems do not address how a UE may perform the time and frequency tracking to get synchronized when the DRX ON duration starts. Fine frequency and time tracking may also be required during an initial access procedure. The Remain Minimum System Information (RMSI) and Random Access Response (RAR) may be transmitted on PDSCH, which may be modulated with high quadrature amplitude modulation (QAM), for example, 16 QAM or more. Accurate time and frequency tracking may be required for demodulation and data reception where coarse frequency tracking acquired from an SS block is not enough. Existing NR systems do not address how a UE may perform time and frequency tracking during an initial access procedure. Additionally, URLLC data may need to be transmitted to a UE immediately in an NR system. The targeted UE may not be able to receive the URLLC data at that moment because the UE may not have fine time and frequency synchronization with a serving cell. The URLLC data may be transmitted in few symbols, which may not be enough to schedule a self-contained TRS. Existing NR systems do not address sending a TRS to a UE with URLLC data.

Example methods and devices are described herein that may provide solutions to one or more the above-described problems, among others. TRS designs and mechanisms for TRS configuration and signaling are described, as well as mechanisms for time and frequency tracking for DRX, RAR, and RMSI. Mechanisms for time and frequency tracking for URLLC data are also described.

In NR, TRS burst is introduced to make resource elements of TRS have sufficient density in time and frequency to enable accurate time and frequency tracking. Each TRS burst may contain 1 or 2 slots.

To demodulate data received in a PDSCH, a UE may first need to get fine time and frequency tracking using the TRS. After the UE is fine time and frequency synchronized, the UE may perform channel estimation using the DMRS and may demodulate and decode the PDSCH. Good accuracy is especially required for high order QAM cases. It may be desirable to allocate the TRS RE as early as possible in a slot for minimizing latency in decoding the CBGs in the PDSCH. In NR, an n-symbol PDCCH containing a Control Resource Set (CORESET) may be placed at the nth symbols at the beginning of the slot where n=1, 2, 3.

For example, there are several options for the location of the first symbol of TRS. The first symbol of TRS may be placed in one of the first n symbols of the slot. Because the first n symbols may also be used for transmitting the CORESET, there may be potential risk of a colliding of TRS and CORESET. However, the CORESET may not occupy the full cell bandwidth. The ways in which this problem may be addressed comprise the following three options.

First, the TRS may be not scheduled in the CORESET region and may be scheduled outside the CORESET. The gNB may indicate to the UE the CORESET region and TRS configuration through higher layer signaling, for example, RRC signaling or RRC signaling configuration with DCI dynamic signaling or RRC signaling configuration with MAC CE based dynamic signaling.

Second, the TRS may be scheduled in both the unused resources in CORESET region and outside the CORESET region. The configuration may be indicated through the DL grant.

Third, the TRS may be scheduled in the region where a CORESET is scheduled, the overlapped TRS RE may be punctured by control signaling in the CORESET to ensure the transmission of the CORESET. The unused CORESET resources may be indicated by the UE's DL grant based on which the UE can identify the resources for the TRS within the CORESET.

The first symbol of TRS may be placed in one of the (n+1)th and (n+2)th symbol of the slot which may contain the front loaded DMRS for PDSCH. For both front loaded DMRS and additional DMRS in later symbols, the TRS RE may be interleaved with the DMRS, and PDSCH may rate match around it. An example is shown in FIG. 1A.

The first symbol of TRS may be placed in one of the (n+3)th and later symbols. In this example, PDSCH may be rate matched around the TRS RE, and TRS may be interleaved with or share some common REs with the potential additional DMRS for PDSCH.

Figure 1B:
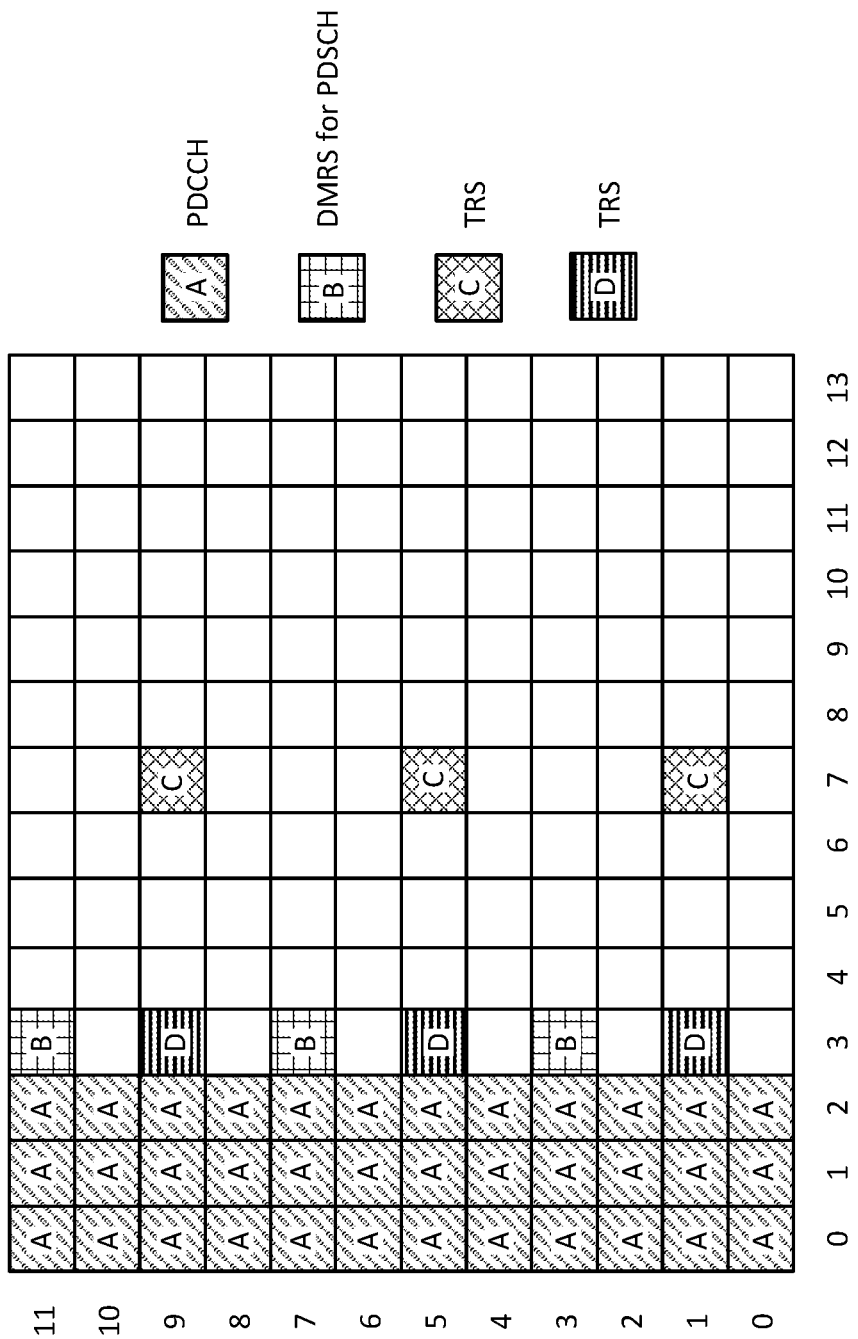
FIG. 1B illustrates an example of TRS RE and front-loaded DMRS for PDSCH share some common REs.

The first symbol of TRS may be placed in one of the (n+1)th and (n+2)th symbols of the slot that contains the front loaded DMRS for PDSCH. The front loaded DMRS REs may be reused as the REs in the first symbol of TRS. An example is shown in FIG. 1B.

Additionally, the TRS may be allocated in a number of ways, as shown, for example, in FIGS. 2A-2E.

The location of the TRS may be fixed. The first symbol location of TRS may not be dependent on the PDCCH/CORESET duration. Regardless of the value of n, the possible symbol location of the first TRS symbol comprises the following three options.

Figure 2A:
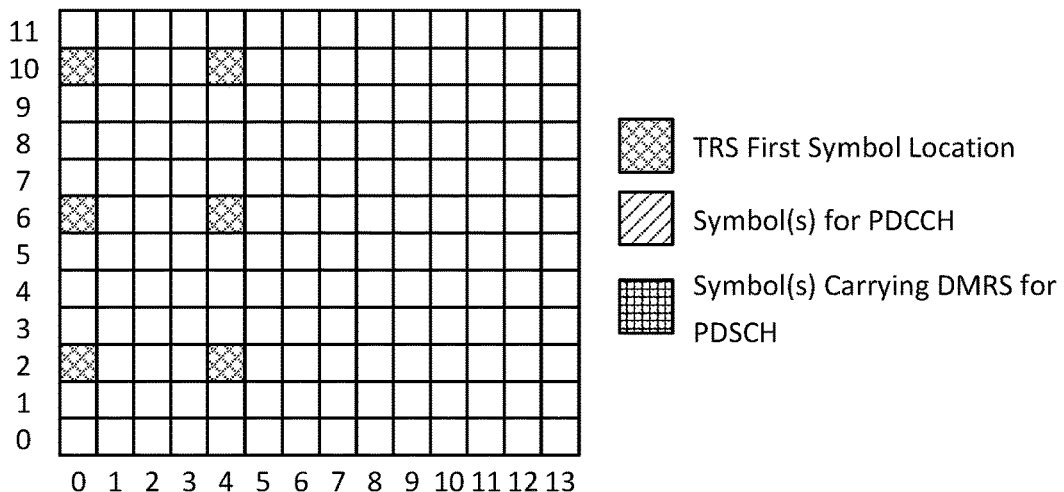
FIGS. 2A-E illustrate examples of TRS first symbol possible locations.

First, the first TRS symbol may be located in the first symbol of a slot when TRS is scheduled on the region of PDCCH, shown as in FIG. 2A.

Figure 2B:
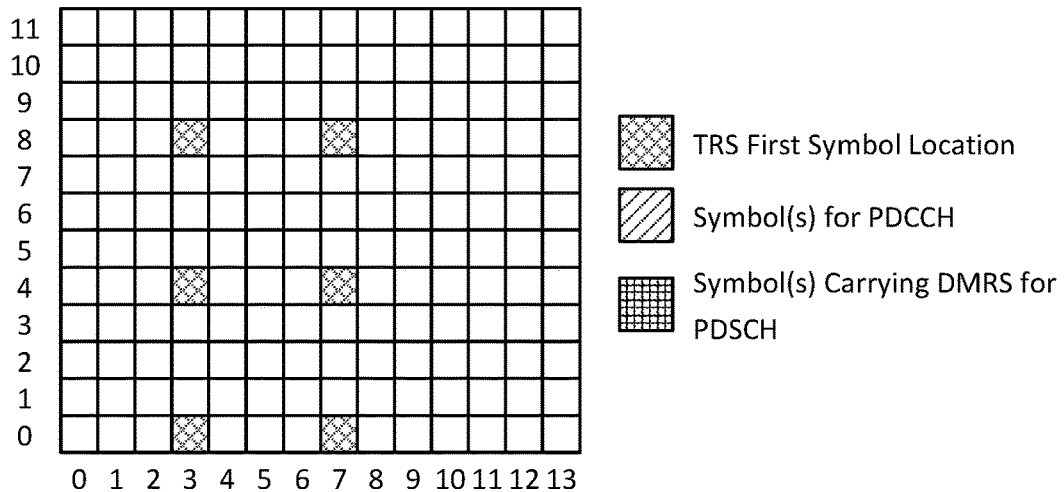

Second, the first TRS symbol may be located in the fourth symbol of a slot when TRS is scheduled to be frequency multiplexed with DMRS for PDSCH, shown as in FIG. 2B.

Figure 2C:
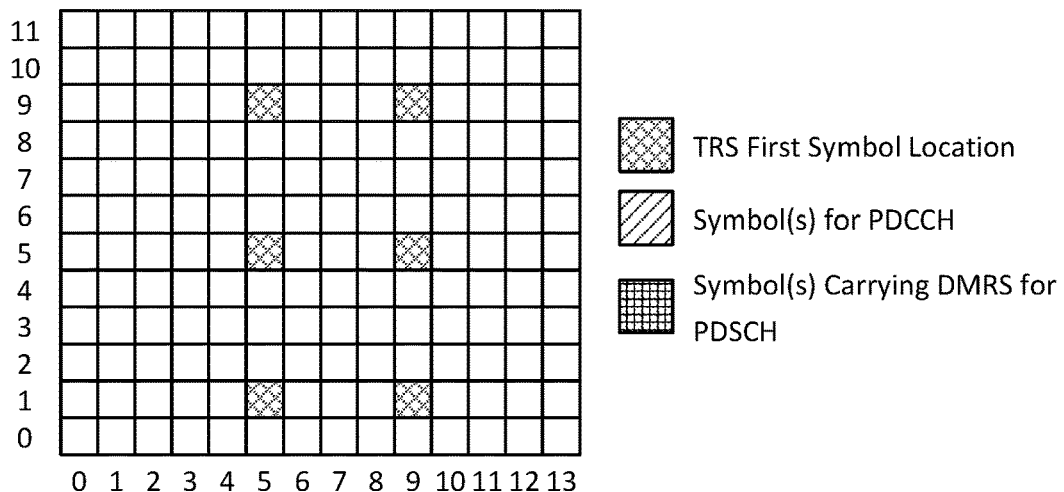

Third, the first TRS symbol may be located in the sixth symbol of a slot when TRS is scheduled on non DMRS region in PDSCH to avoid overlapping with both potential DMRS symbol and PDCCH symbol, shown as in FIG. 2C.

The location of the TRS may be dependent on the CORESET duration. The configured TRS may have different symbol locations when the UE has different PDCCH/CORESET duration n. The possible symbol locations of the first TRS symbol comprises the following two options.

Figure 2D:
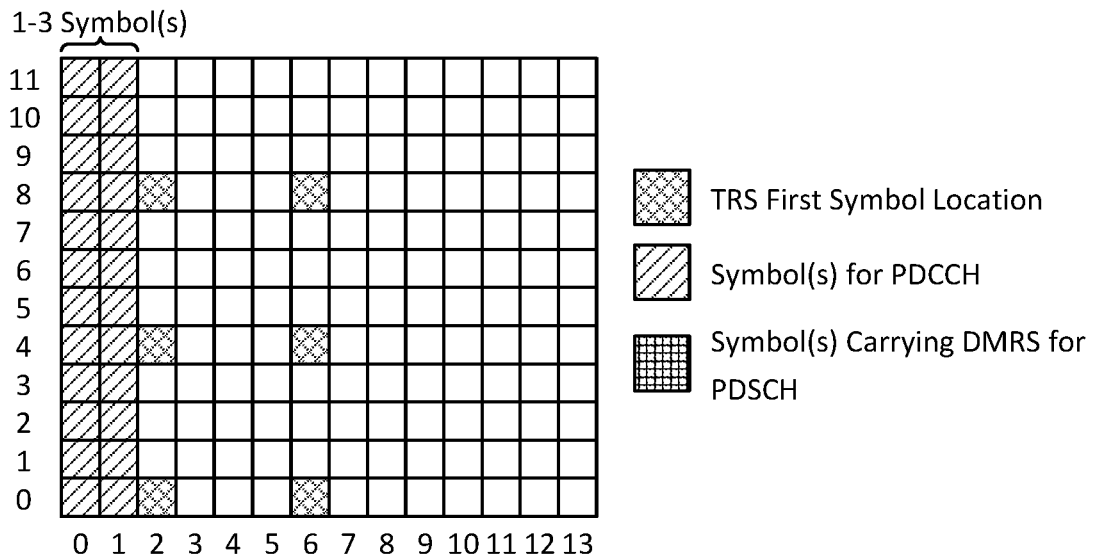

First, the first TRS symbol may be located in the (n+1)th symbol of a slot when TRS is scheduled to be frequency multiplexed with DMRS for PDSCH, shown as in FIG. 2D.

Figure 2E:
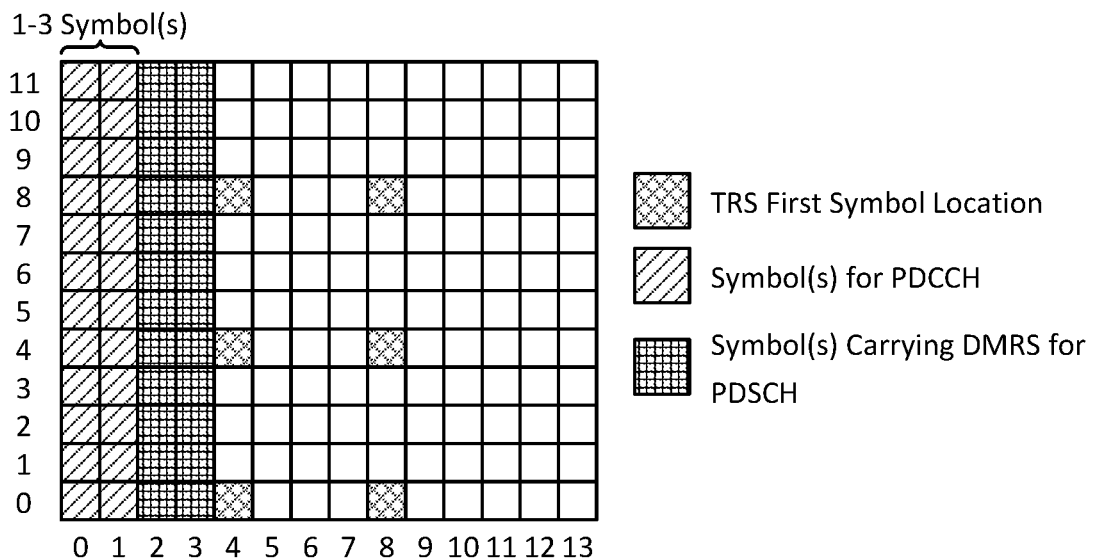

Second, the first TRS symbol may be located in the (n+3)th symbol of a slot when TRS is scheduled on a non DMRS region in PDSCH to avoid overlapping with both potential DMRS symbols and PDCCH symbols, shown as in FIG. 2E.

For one slot TRS burst, the values of N and St may determine the location of a TRS symbol, where N may denote the number of OFDM symbols per TRS within a slot and St may denote the TRS symbol spacing within a slot.

Assuming the TRS symbol is uniformly distributed within the slot, if the TRS location is fixed for UE with different CORESET duration, the choice of format of the TRS burst comprise the following eight options.

First, if the first TRS symbol is located in the first symbol of a slot, When N=4, the value of St may be 3, 4 with TRS symbol index 0, 0+St, 0+2St, 0+3St. Here St=3 may be used for both a DL-only slot and a slot containing both DL and UL, St=4 may be used for the DL-only slot.

Second, if the first TRS symbol is located in the first symbol of a slot, when N=3, the value of St may be 3, 4, 5, 6 with TRS symbol index 0, 0+St, 0+2St. Here St=3, 4, 5 may be used for both a DL-only slot and a slot containing both DL and UL, St=6 may be used for the DL-only slot.

Third, if the first TRS symbol is located in the first symbol of a slot, when N=2, the value of St may be 3, 4, 5, 6, 7, 8, 9, 10, 11, 12, 13 with TRS symbol index 0, 0+St. Here St=3, 4, 5, 6, 7, 8, 9, 10 may be used for both a DL-only slot and a slot containing both DL and UL, St=11, 12, 13 may be used for the DL-only slot.

Fourth, if the first TRS symbol is located in the fourth symbol of a slot, when N=4, the value of St may be 3 with TRS symbol index 3, 3+St, 3+2St, 3+3St. Here St=3 may be used for the DL-only slot.

Fifth, if the first TRS symbol is located in the fourth symbol of a slot, when N=3, the value of St may be 3, 4, 5 with TRS symbol index 3, 3+St, 3+2St. Here St=3 may be used for both a DL-only slot and a slot containing both DL and UL, St=4, 5 may be used for the DL-only slot.

Sixth, if the first TRS symbol is located in the fourth symbol of a slot, when N=2, the value of St may be 3, 4, 5, 6, 7, 8, 9, 10 with TRS symbol index 3, 3+St. Here St=3, 4, 5, 6, 7 may be used for both a DL-only slot and a slot containing both DL and UL, St=8, 9, 10 may be used for the DL-only slot.

Seventh, if the first TRS symbol is located in the sixth symbol of a slot, when N=3, the value of St may be 3, 4 with TRS symbol index 5, 5+St, 5+2St. Here St=4, 5 may be used for the DL-only slot.

Eighth, if the first TRS symbol is located in the sixth symbol of a slot, when N=2, the value of St may be 3, 4, 5, 6, 7, 8 with TRS symbol index 5, 5+St. Here St=3, 4, 5 may be used for both a DL-only slot and a slot containing both DL and UL, St=6, 7, 8 may be used for the DL-only slot.

If the TRS location is dependent on CORESET duration, the TRS burst may different formats based on where the first TRS symbol is located. If the first TRS symbol is located in the (n+1)th symbol of a slot, the options for format comprise the following nine options.

First, when N=4 and n=1, the value of St may be 3, 4 with TRS symbol index 1, 1+St, 1+2St, 1+3St; where St=3 may be used for both a DL-only slot and a slot containing both DL and UL, St=4 may be used for the DL-only slot.

Second, when N=4 and n=2, the value of St may be 3 with TRS symbol index 2, 2+St, 2+2St, 2+3St; where St=3 may be used for the DL-only slot.

Third, when N=4 and n=3, the value of St may be 3 with TRS symbol index 3, 3+St, 3+2St, 3+3St; where St=3 may be used for the DL-only slot.

Fourth, when N=3 and n=1, the value of St may be 3, 4, 5, 6 with TRS symbol index 1, 1+St, 1+2St; where St=3, 4 may be used for both a DL-only slot and a slot containing both DL and UL, St=5, 6 may be used for the DL-only slot.

Fifth, when N=3 and n=2, the value of St may be 3, 4, 5 with TRS symbol index 2, 2+St, 2+2St; where St=3, 4 may be used for both a DL-only slot and a slot containing both DL and UL, St=5 may be used for the DL-only slot.

Sixth, when N=3 and n=3, the value of St may be 3, 4, 5 with TRS symbol index 3, 3+St, 3+2St; where St=3 may be used for both a DL-only slot and a slot containing both DL and UL, St=4, 5 may be used for the DL-only slot.

Seventh, when N=2 and n=1, the value of St may be 3, 4, 5, 6, 7, 8, 9, 10, 11, 12 with TRS symbol index 1, 1+St; where St=3, 4, 5, 6, 7, 8, 9 may be used for both a DL-only slot and a slot containing both DL and UL, St=10, 11, 12 may be used for the DL-only slot.

Eighth, when N=2 and n=2, the value of St may be 3, 4, 5, 6, 7, 8, 9, 10, 11 with TRS symbol index 2, 2+St; where St=3, 4, 5, 6, 7, 8 may be used for both a DL-only slot and a slot containing both DL and UL, St=9, 10, 11 may be used for the DL-only slot.

Ninth, when N=2 and n=3, the value of St may be 3, 4, 5, 6, 7, 8, 9, 10 with TRS symbol index 3, 3+St; where St=3, 4, 5, 6, 7 may be used for both a DL-only slot and a slot containing both DL and UL, St=8, 9, 10 may be used for the DL-only slot.

If the TRS location is dependent on CORESET duration, and the first TRS symbol is located in the (n+3)th symbol of a slot, the options for format comprise the following eight options.

First, when N=4 and n=1, the value of St may be 3 with TRS symbol index 3, 3+St, 3+2St, 3+3St; where St=3 may be used for the DL-only slot.

Second, when N=4 and n=2, the value of St may be 3 with TRS symbol index 4, 4+St, 4+2St, 4+3St; where St=3 may be used for the DL-only slot.

Third, when N=3 and n=1, the value of St may be 3, 4, 5 with TRS symbol index 3, 3+St, 3+2St; where St=3 may be used for both a DL-only slot and a slot containing both DL and UL, St=4, 5 may be used for the DL-only slot.

Fourth, when N=3 and n=2, the value of St may be 3, 4 with TRS symbol index 4, 4+St, 4+2St; where St=3 may be used for both a DL-only slot and a slot containing both DL and UL, St=4 may be used for the DL-only slot.

Fifth, when N=3 and n=3, the value of St may be 3, 4 with TRS symbol index 5, 5+St, 5+2St; where St=3, 4 may be used for the DL-only slot.

Sixth, when N=2 and n=1, the value of St may be 3, 4, 5, 6, 7, 8, 9, 10 with TRS symbol index 3, 3+St; where St=3, 4, 5, 6, 7 may be used for both a DL-only slot and a slot containing both DL and UL, St=8, 9, 10 may be used for the DL-only slot.

Seventh, when N=2 and n=2, the value of St may be 3, 4, 5, 6, 7, 8, 9 with TRS symbol index 4, 4+St; where St=3, 4, 5, 6 may be used for both a DL-only slot and a slot containing both DL and UL, St=7, 8, 9 may be used for the DL-only slot.

Eighth, when N=2 and n=3, the value of St may be 3, 4, 5, 6, 7, 8 with TRS symbol index 5, 5+St; where St=3, 4, 5 may be used for both a DL-only slot and a slot containing both DL and UL, St=6, 7, 8 may be used for the DL-only slot.

For High-Speed Train (HST) scenarios, more symbols of TRS RE may be needed in the TRS pattern in both one slot TRS burst and two slots TRS burst cases compared to the TRS pattern design for general use. For example, 3 or 4 or more symbols of TRS RE may be allocated in both the first slot and second slot to ensure the UE have better frequency tracking.

Figure 3:
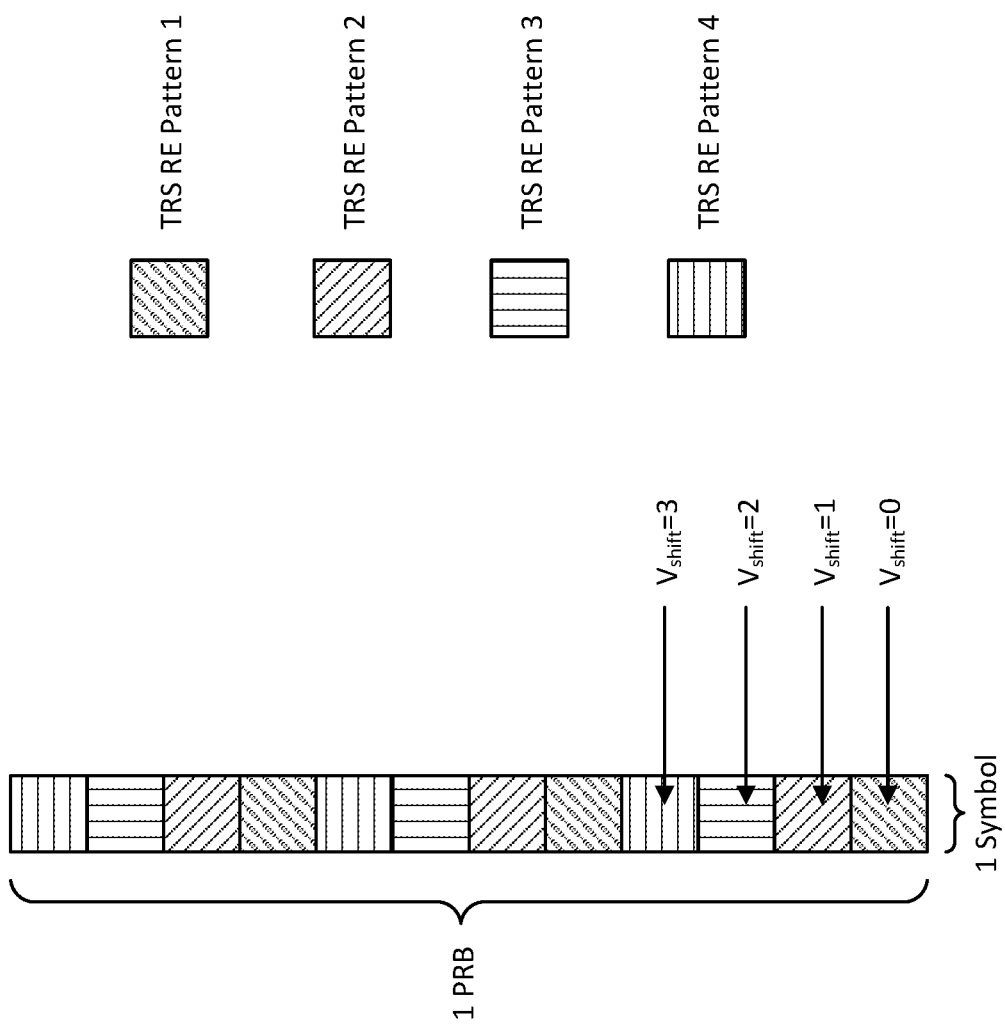
FIG. 3 illustrates an example of possible locations of TRS RE pattern in a symbol with subcarrier spacing Sf=4.

In NR, Sf may represent TRS subcarrier spacing in frequency domain, for example, with Sf=4. Three REs of TRS may be configured in each symbol within a PRB and there may be four possible locations for the TRS within each symbol, as shown in FIG. 3.

Since each TRS pattern may be formed with multiple symbols, there are options for a TRS pattern in a TRS burst. See, for example, FIGS. 4A-C. The options comprise the following three.

Figure 4A:
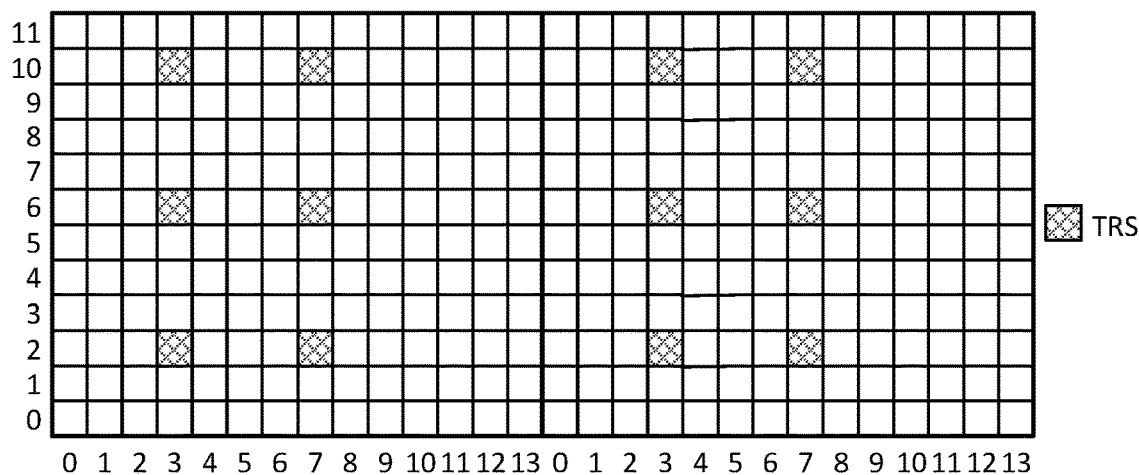
FIGS. 4A-C illustrates examples of TRS RE patterns.

First, the TRS REs in different symbols may occupy the same frequency resources within the slot, as shown in FIG. 4A, i.e., they have the same vshift.

Figure 4B:
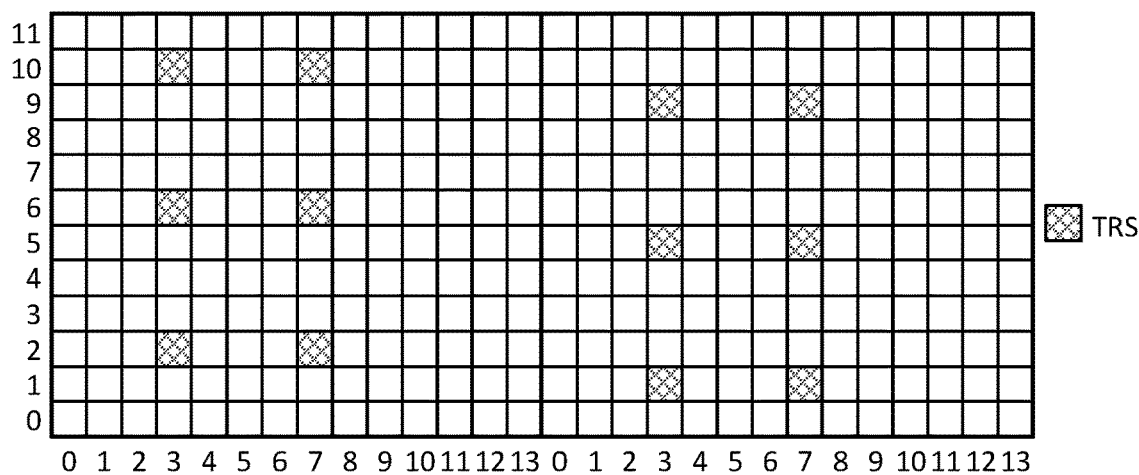

Second, the TRS REs in different symbols may be staggered in frequency with each other between two adjacent symbols, as shown in FIG. 4B, i.e., they have different vshift between slots within a burst.

Figure 4C:
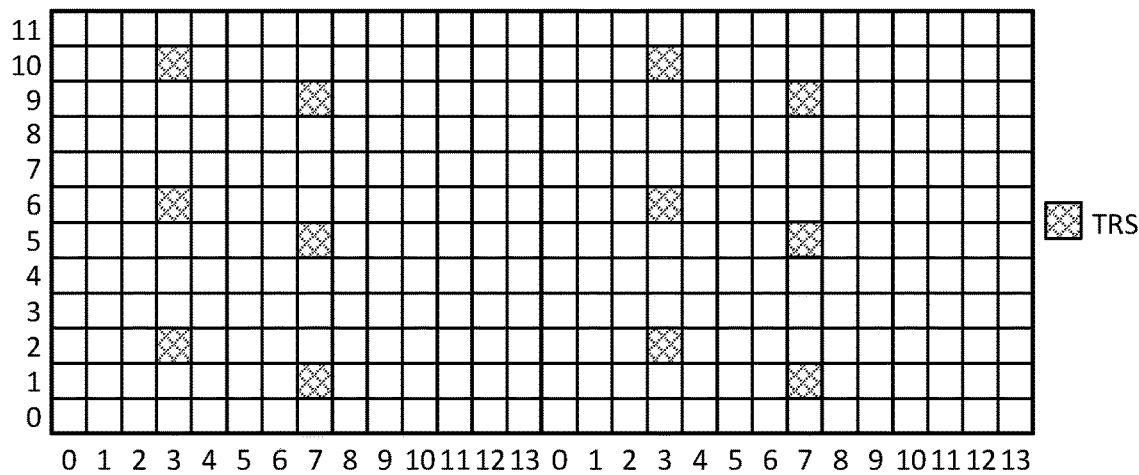
Figure 5A:
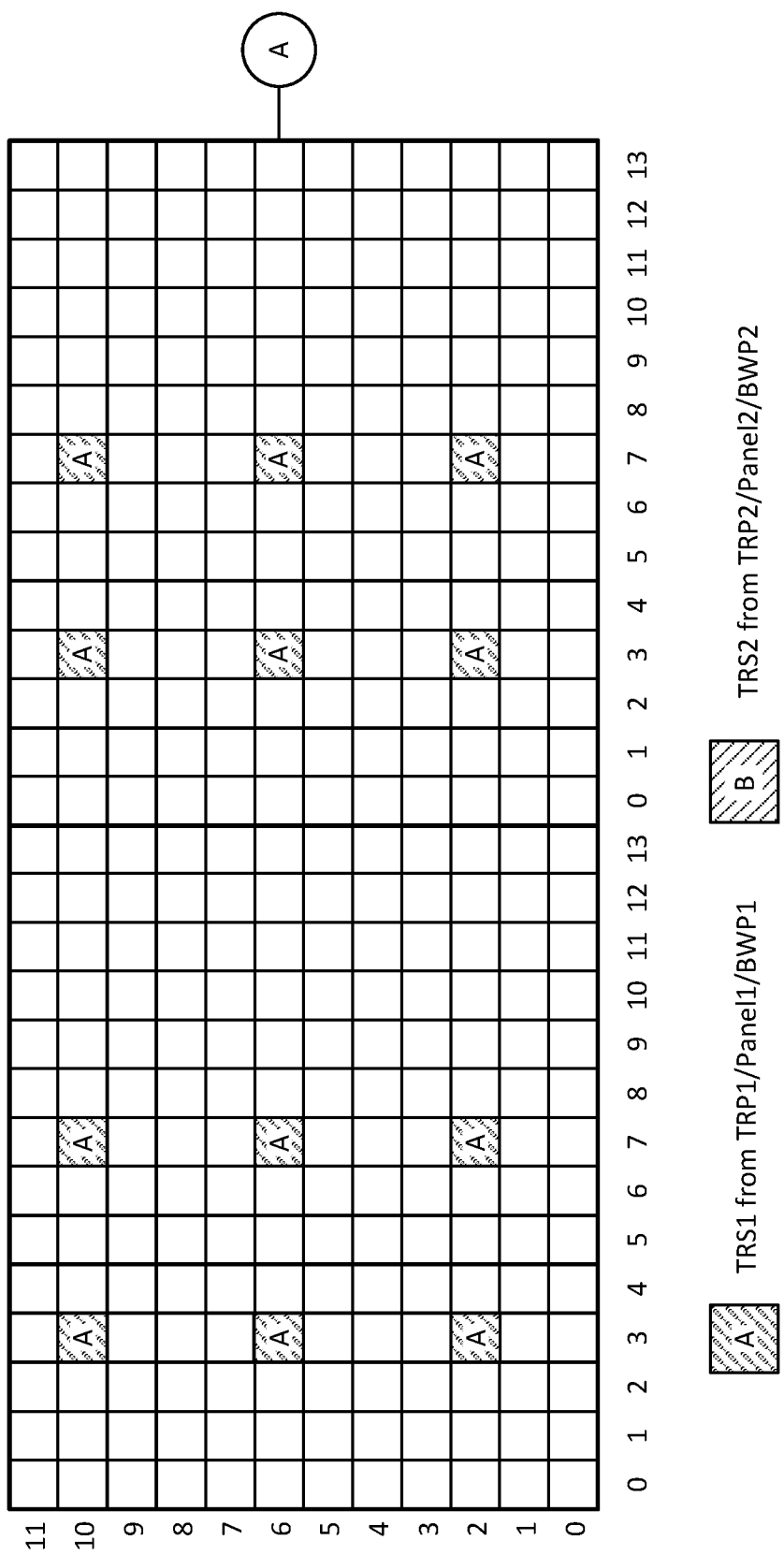
FIGS. 5A-D illustrate examples of a UE receiving two TRSs from two different beams.
Figure 5A:
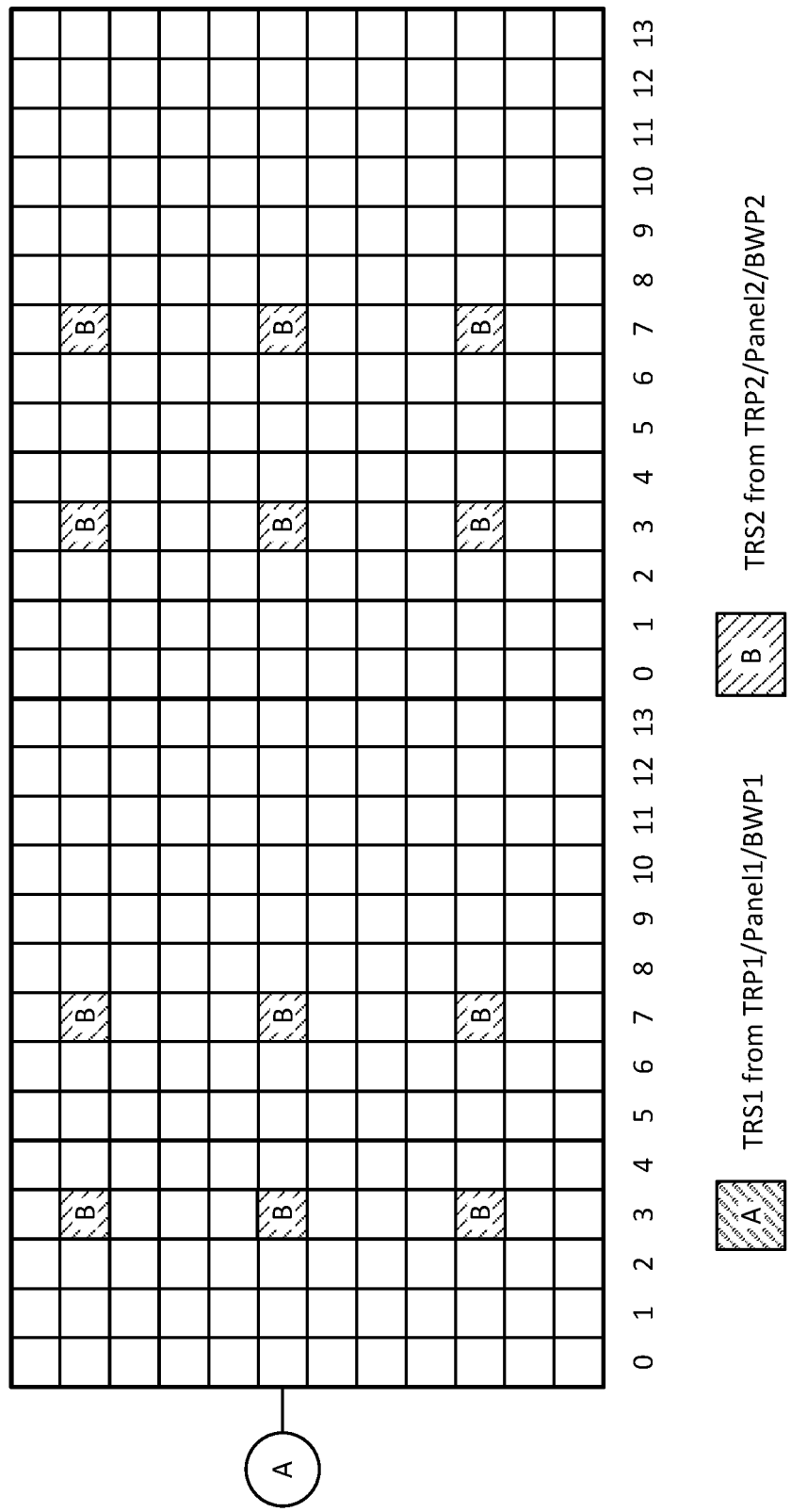
Figure 5B:
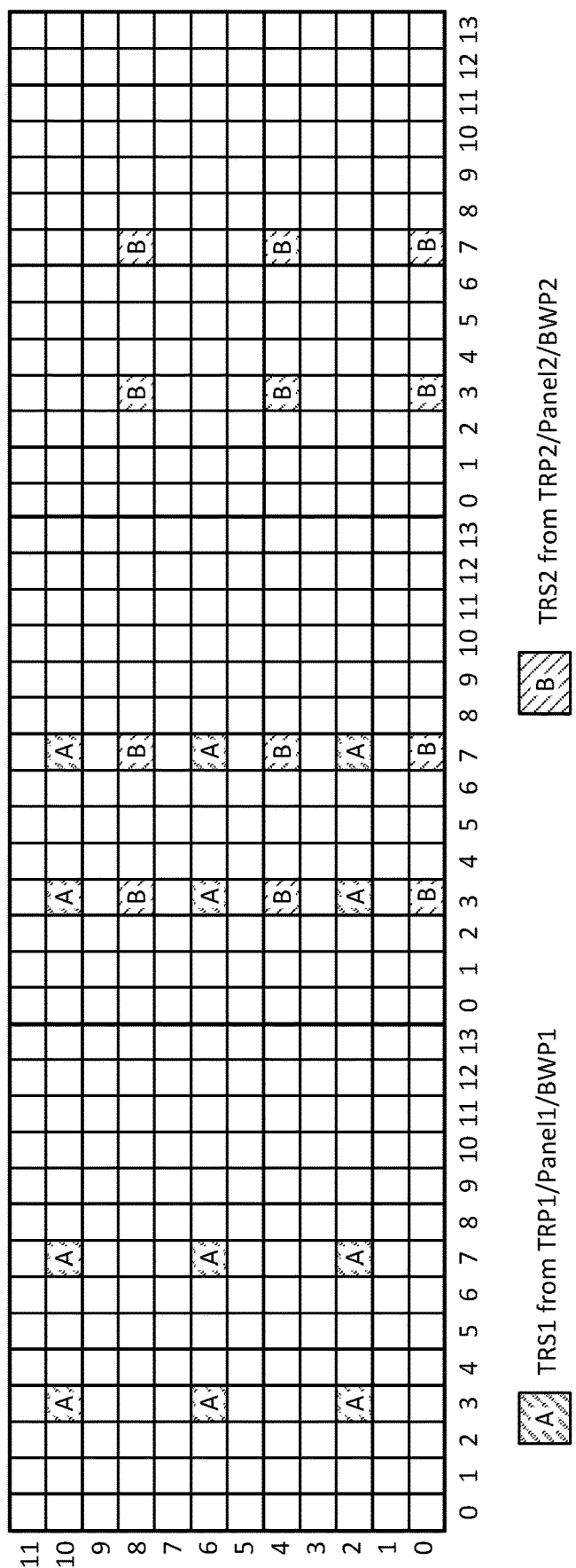
Figure 5C:
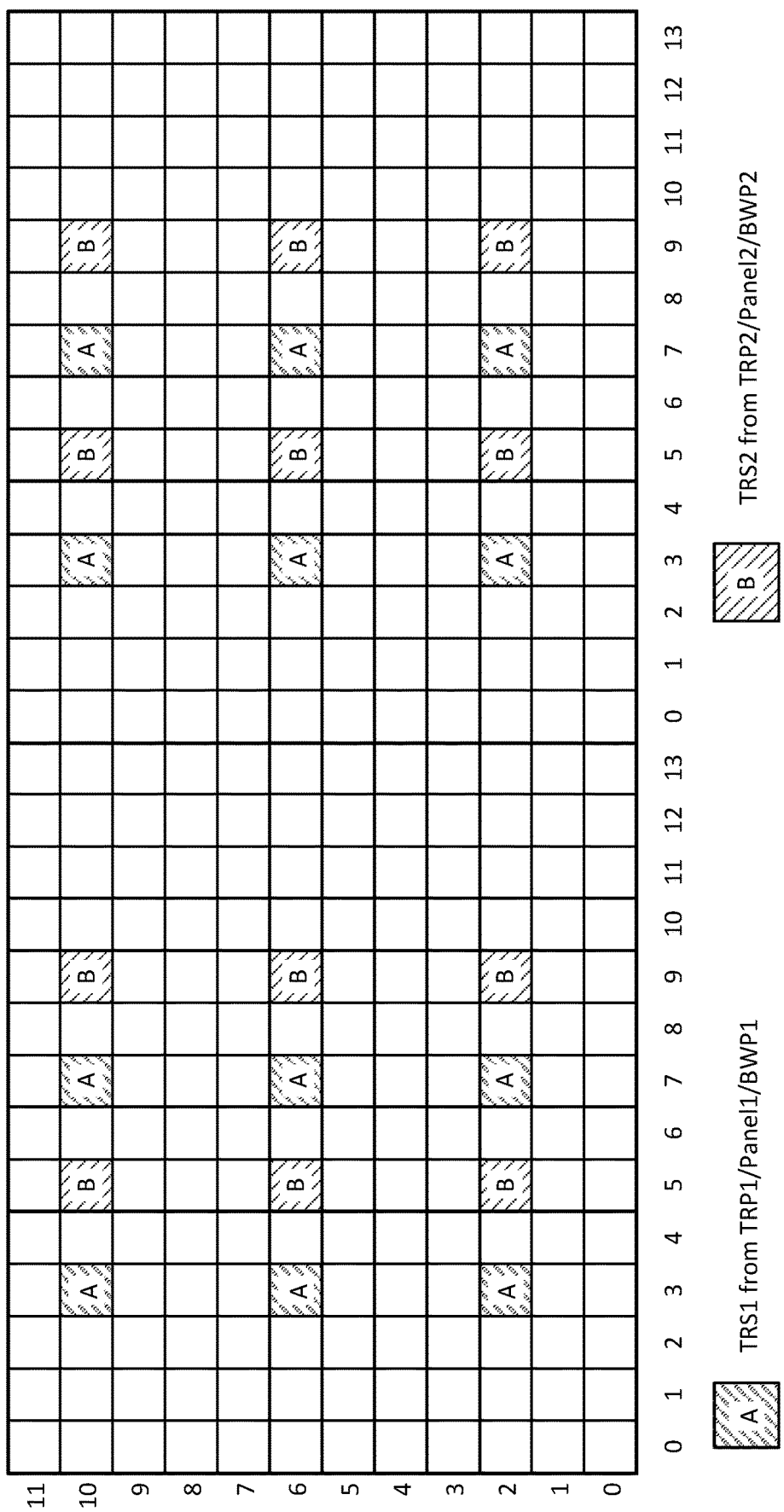
Figure 5D:
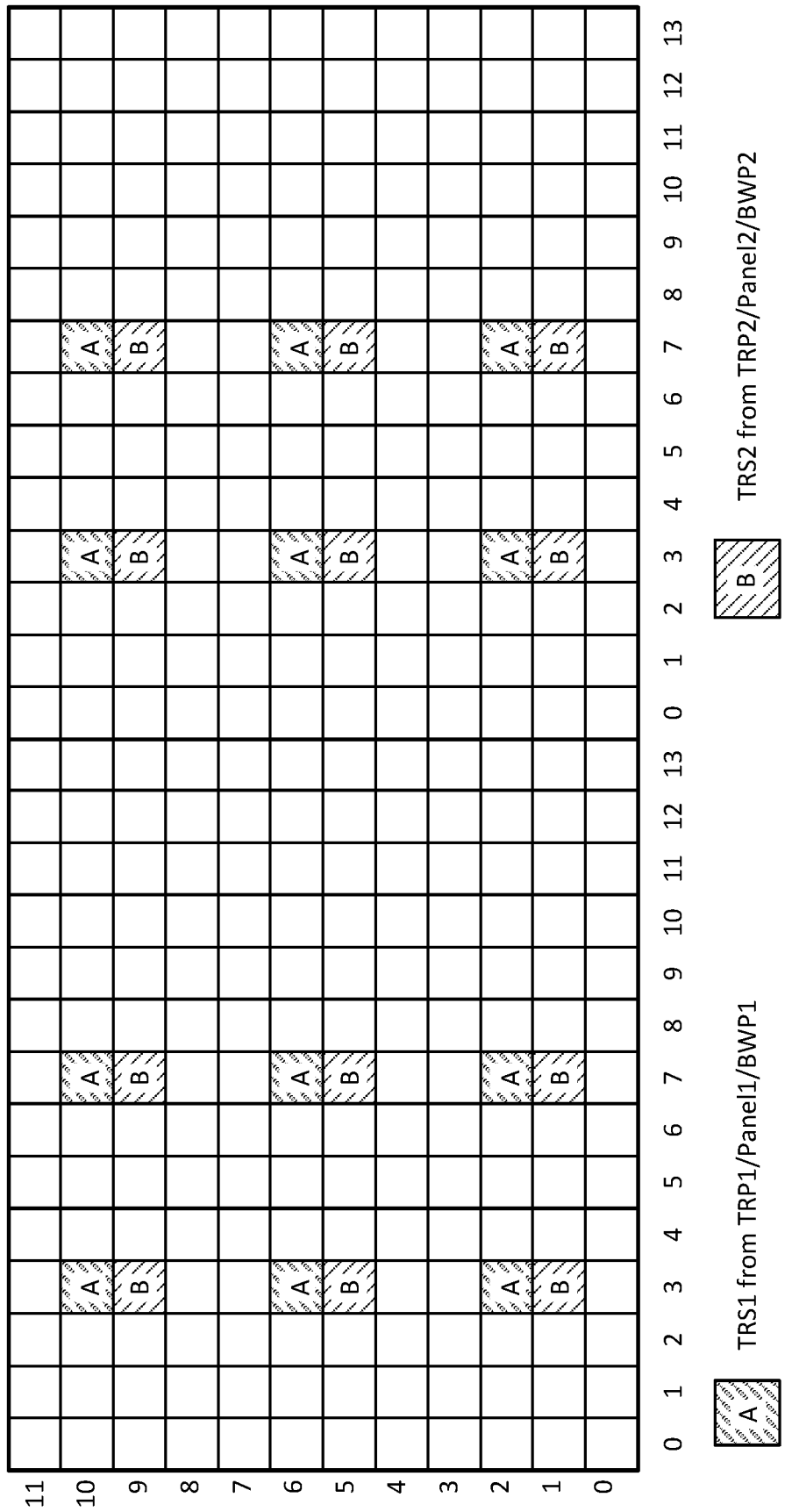

Third, the TRS REs in different symbols may be staggered in frequency within a slot, as shown in FIG. 4C, i.e., they have different vshift between symbols in a burst within a slot.

Variable vshift may provide randomization between beams and cells and may reduce inter beam and inter-call interference.

The TRS sequence may be based on a PN generator. The initializer of the PN sequence generation may be a function of one or more of the following parameters: Cell ID; SSB that it may be QCL-ed with; UE ID, which may refer to C-RNTI (connected mode UE) or IMSI or S-TIMSI (idle/inactive mode UE); port index, which may be the index of a CSI-RS port used to form the TRS configuration; symbol index, which may be symbol locations of the TRS RE in a slot; vshift, which may be a frequency offset of the TRS RE in each symbol referring to the subcarrier 0 in the PRB; and Radio Network Temporary Identifier (RNTI), which may be RA-RNTI, SI-RNTI, or other feasible identifiers. If the TRS is configured specifically for a UE, it may be initialized using UE ID, SSB index, port index, symbol index, vshift. If the TRS is configured for multicast UEs it may be initialized using RNTI, such as SI-RNTI, P-RNTI and RA-RNTI.

In NR, once configured for a UE, a TRS burst may be transmitted with a periodicity of T mS. Options for TRS configuration comprise the three following.

First, TRS may be UE-specific and aperiodic. This may apply to DL PDSCH grant.

Second, TRS may be in Multicast manner. This may apply to a multicast DL PDSCH grant such as SI, paging, etc.

Third, TRS may be UE-specific and periodic/semi-persistent. This may apply to a SPS DL grant.

For cases 1 and 2 in above, the DL grant may indicate the TRS configuration to UE. For case 3 in above, the TRS pattern may be configured through RRC. But the slot structure may vary dynamically through the grant and so the TRS pattern should also varies to suit the slot pattern.

In a slot, a TRS burst may contain 1-3 symbols of PDCCH and 1-2 symbols of UL data. Correspondingly, one symbol of gap may exist if there is UL data in the slot and all other symbols are used for PDSCH. As a result, the slot structure may be very dynamic over time. The TRS configuration signaled to the UE for one time may be not suitable for the next time the TRS may be transmitted again. An example of this problem is as follows. In time t1, the TRS is transmitted, and the slot contains only DL data. In such an example, one of the symbols of the TRS burst may be allocated in the last symbol of the slot. In time t1+T (i.e., the next TRS period), the same TRS may be transmitted. The slot containing the TRS burst may have DL data only or may have both DL and UL data. When the slot contains both DL and UL data, the last symbol may be used for UL data, which may conflict with the scheduled TRS transmission. The same problem may arise in examples where the slots have different numbers of PDCCH symbols. To solve such a problem, the following TRS signaling solutions may be introduced for both static TRS signaling and slot structure based TRS signaling.

For Static TRS signaling, choices for configuration method comprise the following four options.

First, a gNB may configure a TRS burst pattern to a UE through RRC signaling. The configured TRS RE may occur in the symbols which will not potentially be a gap and UL data region, for example, the first eleven symbols where the last three symbols may be used for gap and UL. In this case, the TRS RE may not collide with the gap symbol and UL symbol.

Second, a gNB may configure a TRS burst pattern to a UE through RRC signaling. The configured TRS RE may occur in the symbols which may be a potential gap and UL data region. The gNB may not schedule a UL region in the slot carrying the TRS burst when a TRS transmission is scheduled.

Third, a gNB may configure a TRS burst pattern to a UE through RRC signaling. The configured TRS RE may occur in the symbols which may be a potential gap and UL data region. If the scheduled TRS RE falls into the region used for gap and UL within the same slot carrying the TRS burst, the gNB may only transmit the non-overlapping TRS RE and discard the overlapping TRS RE. The UE may perform time and frequency tracking based on the transmitted TRS RE. This configuration method may apply when there are multiple symbols of TRS RE within the slot and may not cause severe performance degradation by dropping one symbol of TRS RE.

Fourth, a gNB may configure a TRS burst pattern for a UE through RRC signaling. The configured TRS RE may occur in the symbols which may be a potential gap and UL data region. If the scheduled TRS RE falls into the region used for gap and UL within the same slot carrying the TRS burst, the gNB may only transmit the non-overlapping TRS RE. The gNB may shift the overlap TRS RE to some other symbols for compensation, for example, the last symbol before the gap symbol if no TRS RE is scheduled on it.

For slot structured based TRS signaling, the choices for following configuration methods comprise the following three options.

First, TRS configurations may be fixed, as specified in the 3GPP standard. For different slot structures, one fixed TRS configuration or one pre-defined method to generate the TRS configuration may be associated with each slot structure, which may correspond to one combination of the number of PDCCH symbols and number of UL data symbols in a slot. The TRS configurations may be the same or different for different slot structures. The RRC signaling may indicate the periodicity of the TRS burst to a UE. Based on the slot structure indicated by RRC signaling and DCI, the UE may be able to determine the TRS configuration and perform time and frequency tracking.

Second, a gNB may configure a TRS burst configuration source pool. The TRS configuration within the slot carrying the TRS burst may be implicitly signaled to a UE. For example, the UE may determine the TRS configuration based on the number of PDCCH symbols and number of UL data symbols.

Third, a gNB may configure a TRS configuration source pool. The TRS configuration within the slot carrying the TRS burst may be explicitly signaled to a UE. For example, the gNB may dynamically signal the TRS configuration in each period to the UE through DCI based on the slot structure of the scheduled slot that may carry the TRS burst. Alternatively or additionally, the gNB may use a combination of MAC CE and DCI to signal the TRS configuration, where MAC CE may configure a TRS configuration set with K TRS configurations from the configured source pool signaled by RRC, and then the gNB may dynamically signal one or more TRS configurations from the TRS configuration set to the UE via the DCI based on the slot structure.

When the TRS burst contains two slots, the slot structure based TRS signaling may be performed in at least the following two ways. First, the TRS burst configuration may be jointly determined by the slot structures of the first slot and second slot. Second, the TRS burst configuration may be determined by the slot structures of the first slot and second slot separately.

In NR, a UE may need to monitor and receive data from multiple beams from multiple TRPs or panels. To get fine time and frequency synchronized with the beams, multiple TRSs may need to be transmitted. When a UE is configured with multiple TRSs, the slots used to transmit the TRS bursts may be the same, different, or partially overlapped. FIGS. 5A-D show examples of a UE receiving two TRSs from two different beams. The UE may use both of the two received TRSs to perform time and frequency tracking to properly detect the data received from multiple TRPs or panels.

TRSs from different beams may have different configurations, such as periodicity, burst slot number, number of symbols in each slot, symbol location, frequency offset, and other configuration parameters. When multiple TRSs are transmitted in one slot, the TRS pattern may be FDM-ed, TDM-ed, which may be determined by the gNB according to the slot structure and the TRS pattern configuration.

For the transmission of multiple TRPs, the TRPs may be in the same cell or in different cells. If the TRPs are from different cells, the corresponding beams may not be QCL-ed. Then, different TRSs may need to be scheduled to the UE for each beam. If the TRPs are in the same cell, the corresponding beams may be QCL-ed with respect to parameters such as Doppler shift, Doppler spread, average delay, and delay spread. When a QCL-ed relationship is indicated to a UE, at least one TRS should be transmitted for a group of QCL-ed beams, which may follow one of the following examples.

A gNB may schedule multiple TRSs for the QCL-ed beams. The UE may perform joint estimation through the TRSs for the QCL-ed beams for better time and frequency tracking.

A gNB may schedule one TRS for the QCL-ed beams in order to reduce overhead. The time and frequency tracking achieved from the transmitted TRS may be used for the QCL-ed beams for PDSCH demodulation, where the beam used to transmit the TRS follows one of the examples shown in FIGS. 6A and 6B.

Figure 6A:
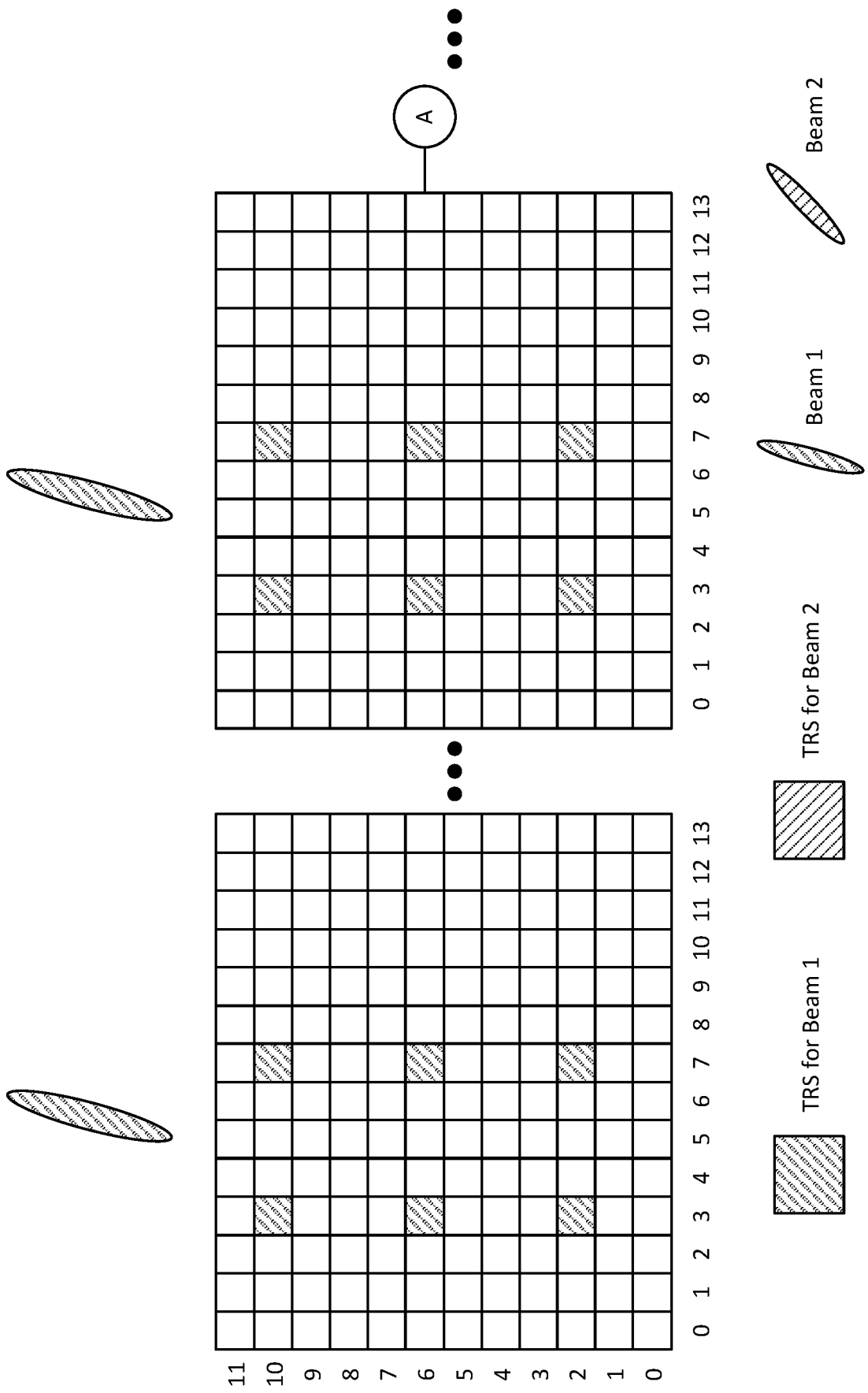
FIGS. 6A-B illustrates examples of a pattern of beams carrying TRS when one TRS is configured for multiple QCL-ed beams.
Figure 6A:
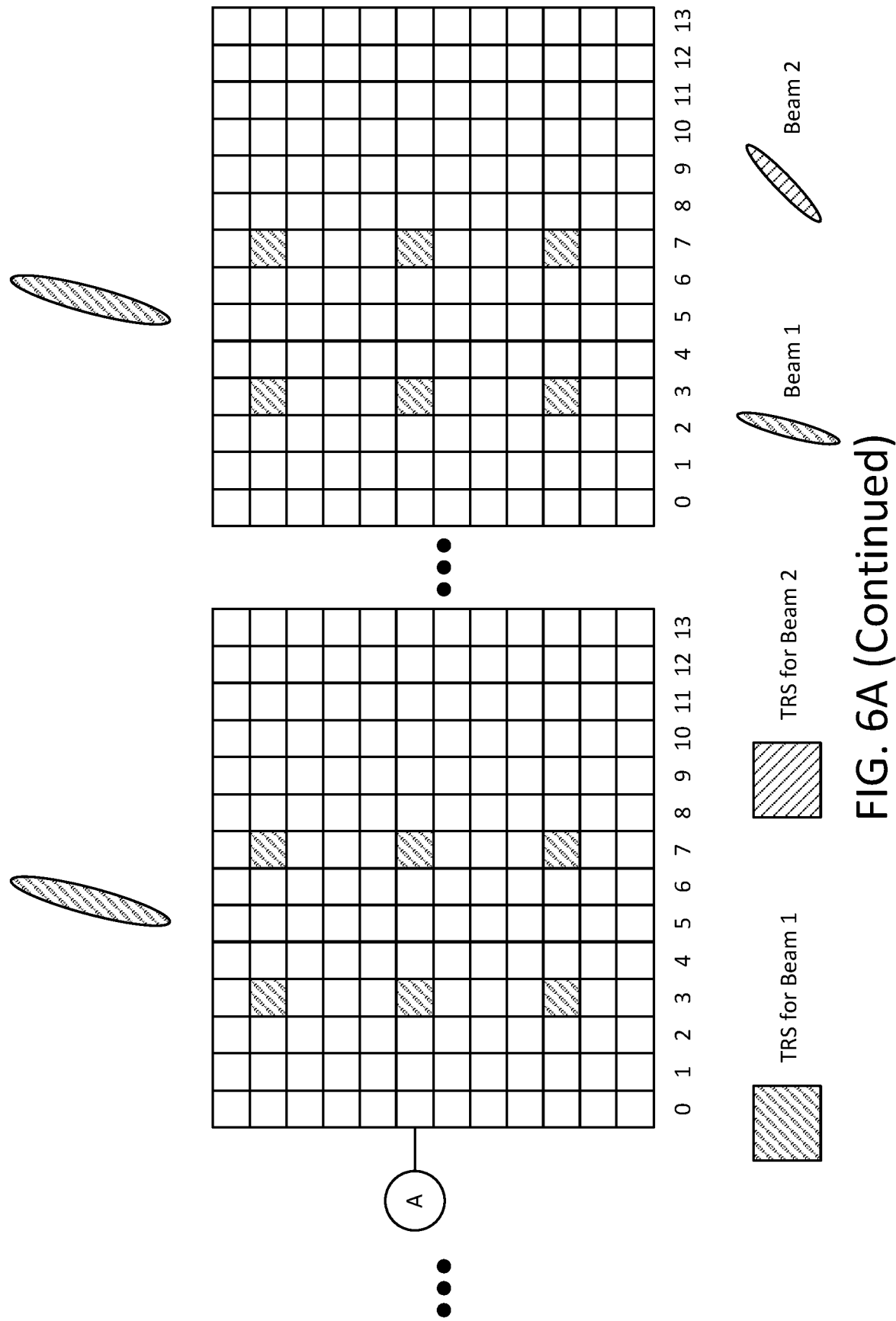

As shown in the example of FIG. 6A, the TRS may be transmitted on one fixed beam within the group of QCL-ed beams The gNB may pick the beam based on certain criteria, such as channel quality and other relevant criteria.

Figure 6B:
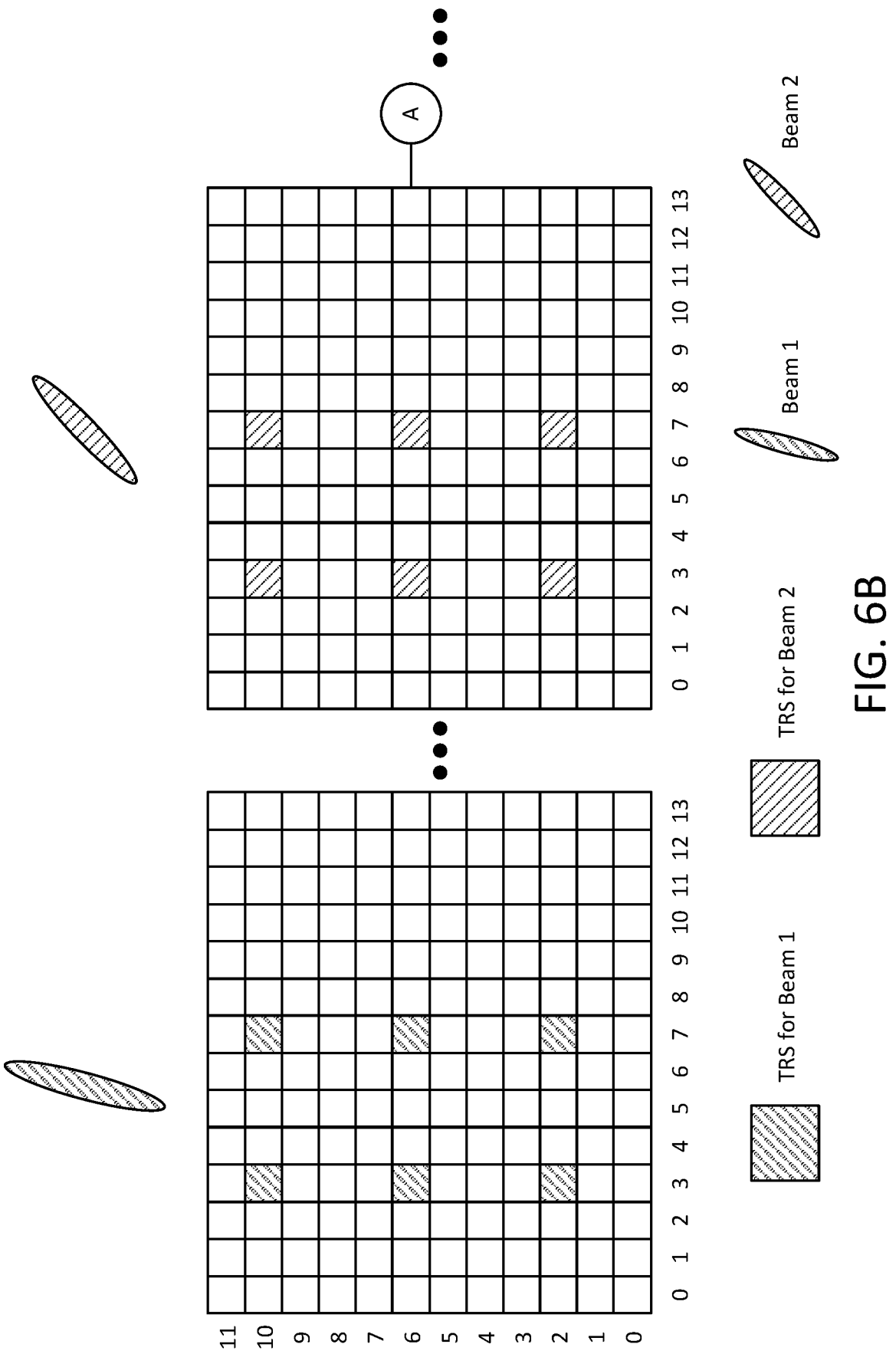
Figure 6B:
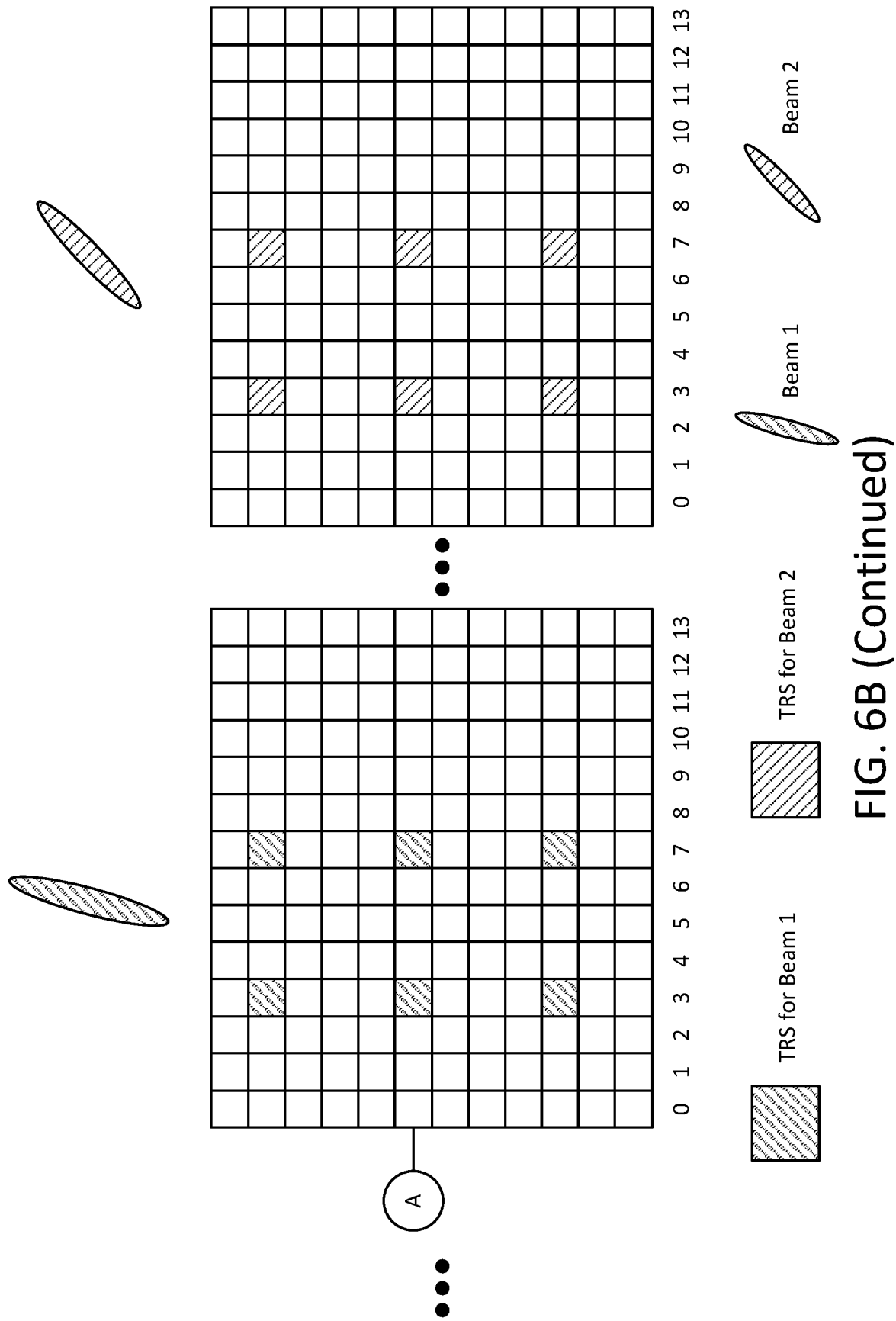

As shown in the example of FIG. 6B, the TRS may be staggeringly transmitted on different beams at different times with a certain pattern of repetition. For example, TRS may be carried on beam 1 in the 1st, 3rd, 5th . . . transmission and on beam 2 in 2nd, 4th, 6th . . . transmission.

A similar approach may be used for multiple panel and multiple BWP scenarios. If a QCL-ed relationship is indicated to the UE with respect to parameters—such as Doppler shift, Doppler spread, average delay, and delay spread—between the panels or BWPs, a gNB may configure one or more TRS to the UE according to different purposes, for example, better time and frequency tracking, reducing overhead, and other relevant considerations. When a UE switches to receive data from another TRP, panel, or BWP, the gNB may deactivate/update the scheduled TRS transmission and active a new TRS transmission through DCI, alternative methods are available depending on whether beams are QCL-ed with beam 1.

If the UE is originally tracking TRS for two QCL-ed beams, for example beam 1 and beam 2, and the UE switches from beam 2 to beam 3 per the gNB indication, then if beam 3 is QCL-ed with beam 1, at least the following three options are available.

First, if only beam 1 is used to transmit TRS in the previous schedule, the gNB may compare the criteria of the beam 1 and beam 3. For example, channel quality may be used for comparison criteria. If the channel quality of beam 1 is better than beam 3, no change may be made for the previous schedule. If the channel quality of beam 3 is better than beam 1, the gNB may update the schedule of the TRS transmission and use beam 3 to transmit the TRS.

Second, if only beam 2 is used to transmit TRS in the previous schedule, the gNB may determine which beam to be used to transmit the TRS by comparing the criteria and updating the previous schedule.

Third, if both beam 1 and beam 2 are used to staggeringly receive the TRS, the gNB may update the previous schedule and replace beam 2 by beam 3.

If beam 3 is not QCL-ed with beam 1, the gNB may active a new TRS transmission for beam 3. The gNB may also update the previous schedule through replacing beam 2 by beam 1.

If the UE is originally tracking TRS for two non QCL-ed beams, for example, beam 1 and beam 2, and switches from beam 2 to beam 3 per the gNB indication, then the gNB may deactivate the TRS transmission on beam 2 and perform one of the four following methods.

First, if beam 3 is QCL-ed with beam 1, the gNB may update the schedule and use both beam 1 and beam 2 to staggeringly transmit the TRS.

Second, if beam 3 is QCL-ed with beam 1 and beam 3 is better than beam 1 in the comparison of the criteria, the gNB may update the previous schedule through replacing beam 1 by beam 3.

Third if beam 3 is QCL-ed with beam 1 and beam 1 is better than beam 3 in the comparison of the criteria, the gNB may make no change in the schedule and may continue to transmit the TRS on beam 1.

Fourth, if beam 3 is not QCL-ed with beam 1, the gNB may active a new TRS transmission for beam 3.

Figure 7:
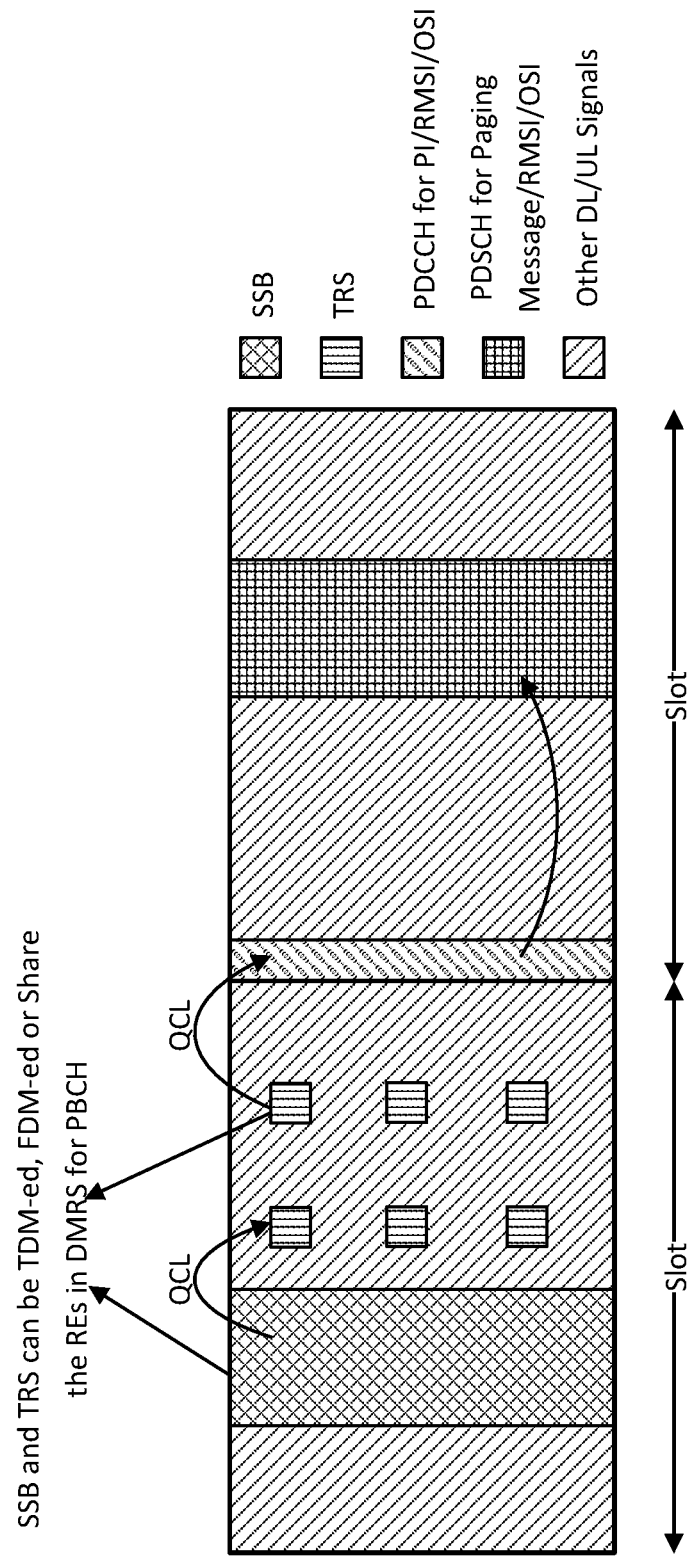
FIG. 7 illustrates an example of SS Block and TRS being transmitted in a slot used for time and frequency tracking for DRX.

Mechanisms may be used for time and frequency tracking for DRX, RAR, and RMSI. When a UE starts a DRX ON duration, the UE should be well synchronized so that the UE may demodulate the PDCCH and PDSCH. A gNB may schedule a periodic/aperiodic SS burst and a periodic/aperiodic TRS burst before or during the DRX ON duration for the UE to do time and frequency tracking. For example, for each beam, the associated SS block and TRS may be scheduled in the same slot, and the UE may assume they are QCL-ed with respect to parameters such as Doppler shift, Doppler spread, average delay, and delay spread, as shown in FIG. 7. After finding the SS block from the best beam, the UE may use the associated TRS to do fine time and frequency tracking to get well synchronized. Then the UE may be able to perform blind decoding of the PDCCH for Paging Indicator/RMSI/OSI/etc. A gNB may transmit two SS blocks and two TRSs for two beams in one slot, for example, SS block 1, SS block 2, TRS 1, and TRS 2. The UE may assume SS block 1 and TRS 1 are QCL-ed, and that SS block 2 and TRS 2 are QCL-ed. However, the UE may not assume the two SS blocks are QCL-ed or that the two TRSs are QCL-ed.

Within the slot, the scheduled SS block and TRS may be TDM-ed, FDM-ed, or the SS block and TRS may share some common REs, for example, TRS may share a DMRS for PBCH. The DMRS for PBCH may be used for functionalities of both demodulating and time and frequency tracking. Because the time spacing of DMRS in a SS block may be only two symbols, using the DMRS in the two PBCH symbols may not be sufficient to provide enough frequency tracking. Therefore, one additional TRS symbol may be introduced, and the UE may do joint estimation using the shared DMRS symbol and the additional TRS symbol for time and frequency tracking, as shown in FIGS. 8A-D. Examples described herein introduce such an additional TRS symbol.

The gNB may transmit additional TRS in the first symbol of the SS block in the PRB that does not contain PSS, for example. For the PRBs that do contain PSS, no TRS may be scheduled. The UE may use the transmitted TRS and the DMRS in the second PBCH to do joint time and frequency tracking, as shown in FIG. 8A.

The gNB may transmit additional TRS k symbols before the SS block where k≥1, for example. The additional TRS may be scheduled in full PBCH band or partial PBCH band. The UE may use the transmitted TRS and the DMRS in the first or second PBCH to do joint time and frequency tracking dependent on the value of k, as shown in FIG. 8B.

The gNB may transmit additional TRS k symbols after the SS block where k≥1, for example. The additional TRS may be scheduled in full PBCH band or partial PBCH band. The UE may use the transmitted TRS and the DMRS in the first or second PBCH to do joint time and frequency tracking dependent on the value of k, as shown in FIGS. 8C-D.

If two SS blocks are scheduled in one slot, the allocation of the TRS for the two SS blocks may be the same or different depending on the location of the two SS blocks and available resources in the slot. For example, both TRS 1 and TRS 2 may be transmitted using the structure shown in FIG. 8A. In an additional example, TRS 1 associated with the first SS block may be transmitted using the structure shown in FIG. 8B. TRS 2 associated with the second SS block may be transmitted using the structure shown in FIG. 8C.

In the initial access procedure, a UE may first send a RACH preamble to a gNB. The gNB may decode the preamble and send a Random Access Response (RAR) message back to the UE on the PDSCH. The UE may need to decode the RAR to determine a message of Timing Advance, Temp-C-RNTI, UL grant for message 3, and other relevant parameters. The synchronization accuracy achieved from one shot SS block may not be enough because the demodulation may require fine time and frequency tracking. To address such a problem, the gNB may send a TRS to the UE associated with the RAR in accordance with one of the following examples. In a first example, the TRS may be triggered by the RACH preamble transmission, and in the second and third examples, the TRS may be triggered by reception of PDCCH scrambled with RA-RNTI from the gNB.

Figure 9A:
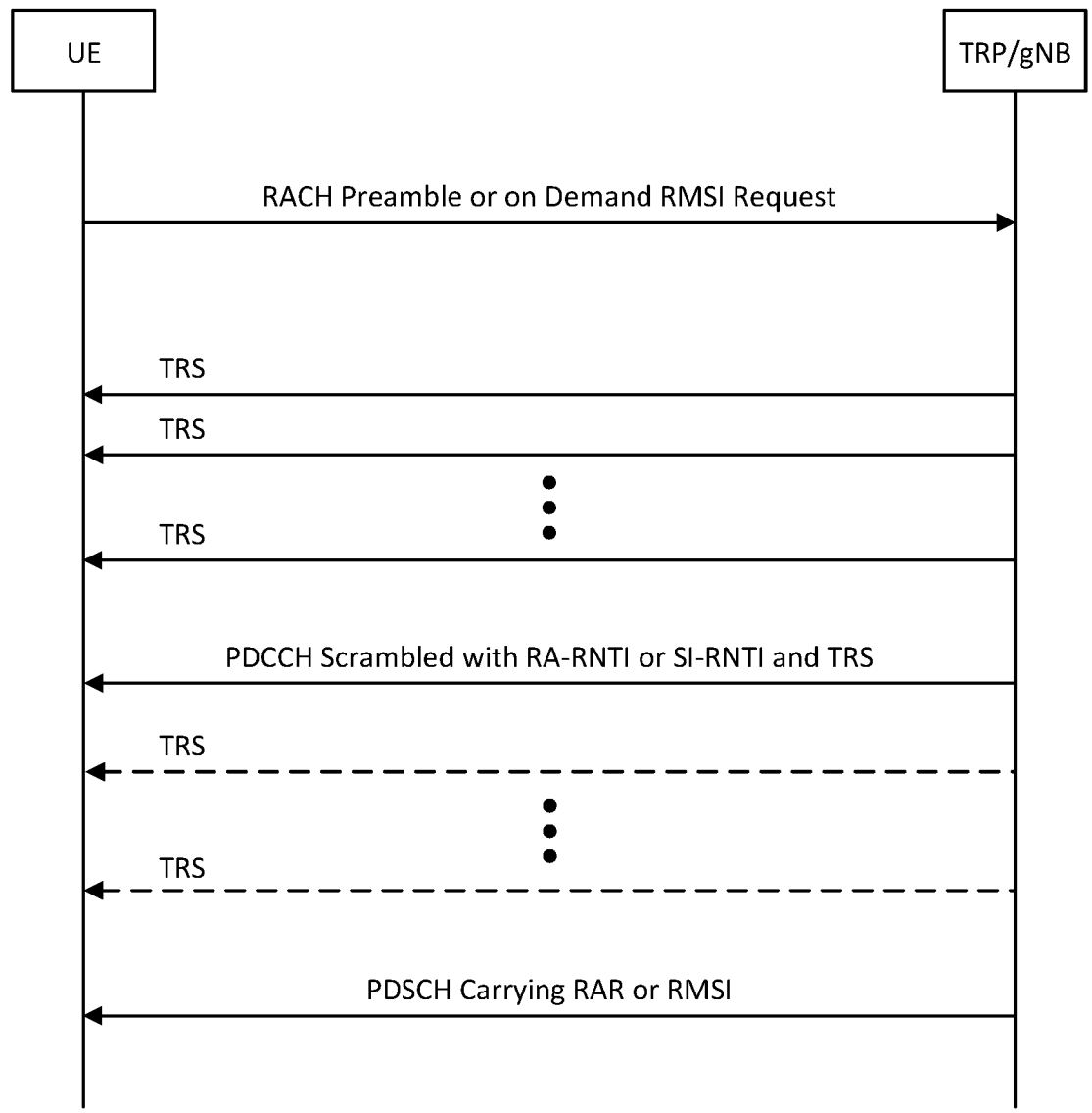
FIGS. 9A-C illustrate examples of call flows for TRS for RAR or on demand RMSI.
Figure 9B:
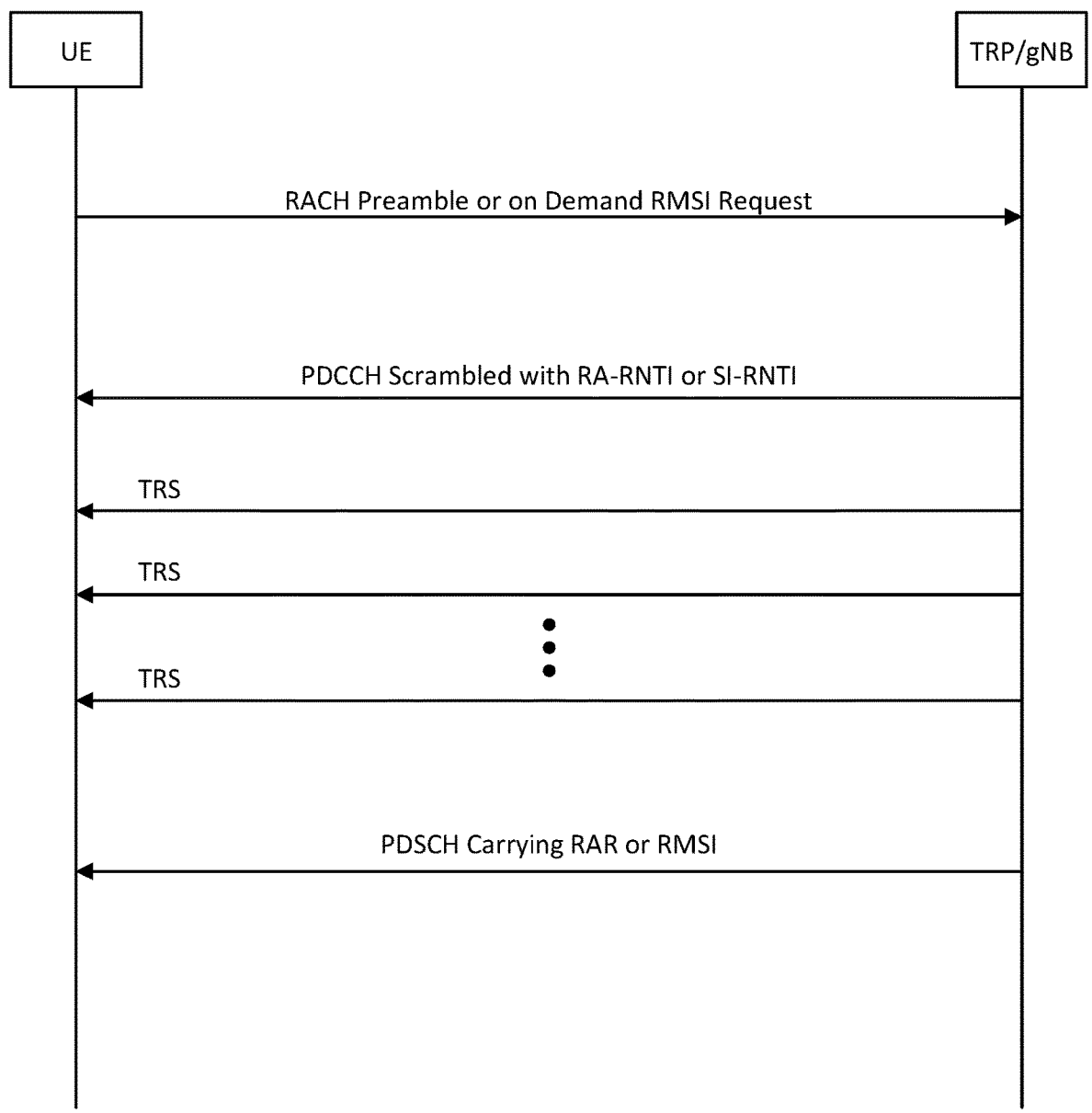

In a first example, the gNB may begin continuous TRS transmission after the gNB receives the RACH preamble from the UE. The UE may begin to measure the TRS after the UE sends the RACH preamble. The TRS may be transmitted on the DL beam(s) associated with the UL beam(s) where the gNB received the RACH preamble. The UE may continue to track the continuous TRS until successful reception of the PDSCH for RAR or until the RAR window expires. After the gNB transmits the PDSCH for RAR, the gNB may deactivate the transmission of the TRS. The UE may stop tracking the TRS after the PDSCH for RAR is received, regardless of the success or failure of the reception. An example of the call flow is shown in FIG. 9A. It should be appreciated that the PDCCH and PDSCH for RAR may be in the same and/or different slots. If the PDCCH and PDSCH are in the different slots, the TRS may keep transmitting in the slots after the PDCCH scrambled with the RA-RNTI is transmitted until the reception of PDSCH for RAR In a second example, the gNB may begin continuous TRS transmission after the gNB sends the PDCCH scrambled with the RA-RNTI to the UE. The TRS may be transmitted on the DL beam(s) associated with the UL beam(s) where the gNB received the RACH preamble. The UE may continue to monitor the PDCCH region to detect the PDCCH scrambled with the RA-RNTI after the UE sends the RACH preamble to gNB. The PDSCH for RAR may be transmitted some slots later after the PDCCH scrambled with RA-RNTI is transmitted. In this example, the TRS transmission may be triggered by the reception of the PDCCH scrambled with the RA-RNTI from the gNB. After detecting the PDCCH scrambled with the RA-RNTI, the UE may begin to track the TRS and perform time and frequency tuning until the UE receives the PDSCH for RAR. After the gNB transmits the PDSCH for RAR, the gNB may deactivate the transmission of the TRS. The UE may stop tracking the TRS after the PDSCH for RAR is received regardless of the success or failure of the reception. An example of the call flow is shown in FIG. 9B.

Figure 9C:
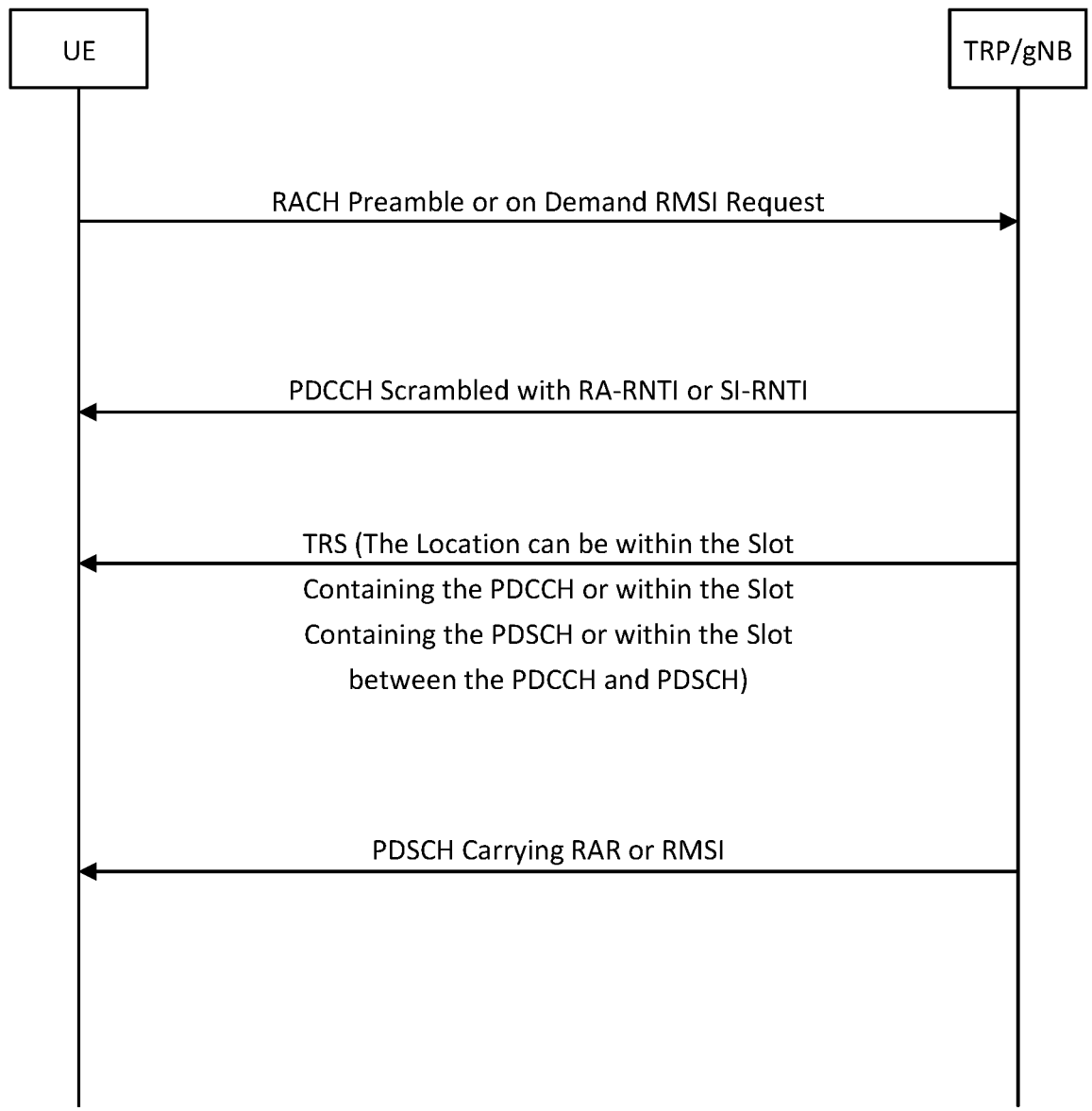

In a third example, the gNB may transmit a one-shot TRS transmission after the gNB sends the PDCCH scrambled with the RA-RNTI to the UE. The RA-RNTI may imply the location of the TRS and the UE may determine the location of the TRS and perform time and frequency tracking. An example of the call flow is shown in FIG. 9C. The location of the TRS may have at least the following alternatives. The TRS may be located in the same slot that contains the PDCCH scrambled with the RA-RNTI; this may be applicable to configurations where the PDCCH and PDSCH are in the same slot and/or different slots. The TRS may be located in a fixed number of slots after the slot containing the PDCCH scrambled with the RA-RNTI; this may be applicable to configurations where the PDCCH and PDSCH are in different slots. The TRS may be located in the same slot that contains the PDSCH for RAR; this may be applicable to configurations where the PDCCH and PDSCH are in the same slot and/or different slots.

It will be appreciated that different TRS patterns may be transmitted among different TRPs. Configuration(s) of the TRS patterns may be indicated by the System Information Block (SIB).

A similar process may be applied to an on demand RMSI transmission. When a UE needs to receive the RMSI, the UE may send a RMSI request. The UE may monitor the PDCCH scrambled with the SI-RNTI to determine the location of the transmitted PDSCH for RMSI. At the same time, the UE may need to receive a TRS for fine time and frequency tracking, which may be triggered by the RMSI request or the reception of the PDCCH scrambled with the SI-RNTI, as shown in FIGS. 9A-C.

Figure 10A:
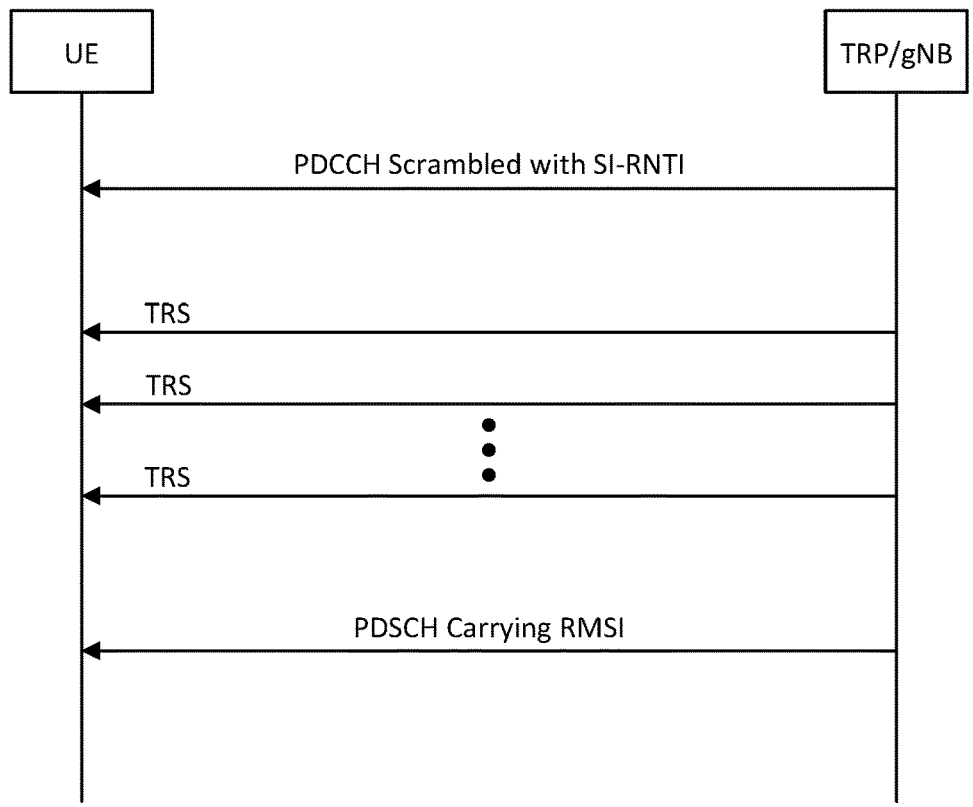
FIGS. 10A-B illustrate examples of call flows for TRS broadcast RMSI.
Figure 10B:
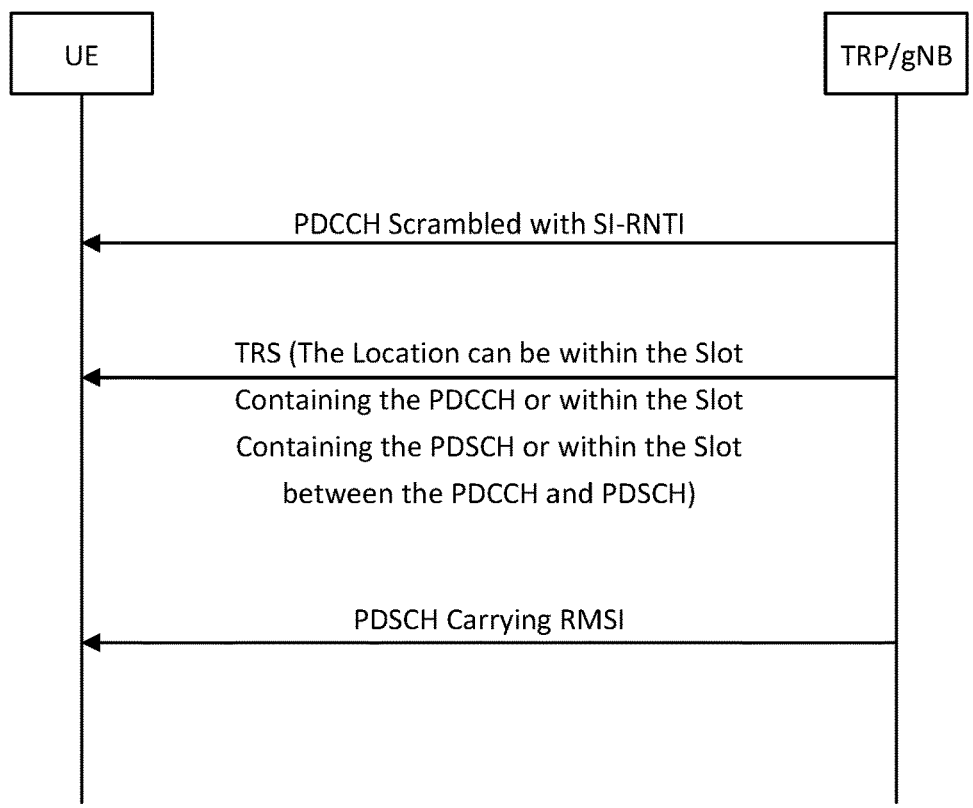

When the RMSI is broadcast to the UE, such as in LTE, the TRS transmission may be triggered by the reception of the PDCCH scrambled with the SI-RNTI. After the PDCCH scrambled with the SI-RNTI is transmitted to UE, a gNB may begin a continuous TRS, for example when PDCCH and PDSCH for RMSI are in different slots, or a one-shot TRS transmission, for example when PDCCH and PDSCH for RMSI are in the same or different slots, to assist the UE with fine time and frequency synchronization, as shown in FIGS. 10A-B. FIG. 10A illustrates an example call flow for the continuous TRS transmitted after the PDCCH scrambled with SI-RNTI is transmitted, and FIG. 10B illustrates an example call flow for the one-shot TRS transmission after the PDCCH scrambled with SI-RNTI is transmitted.

Figure 11:
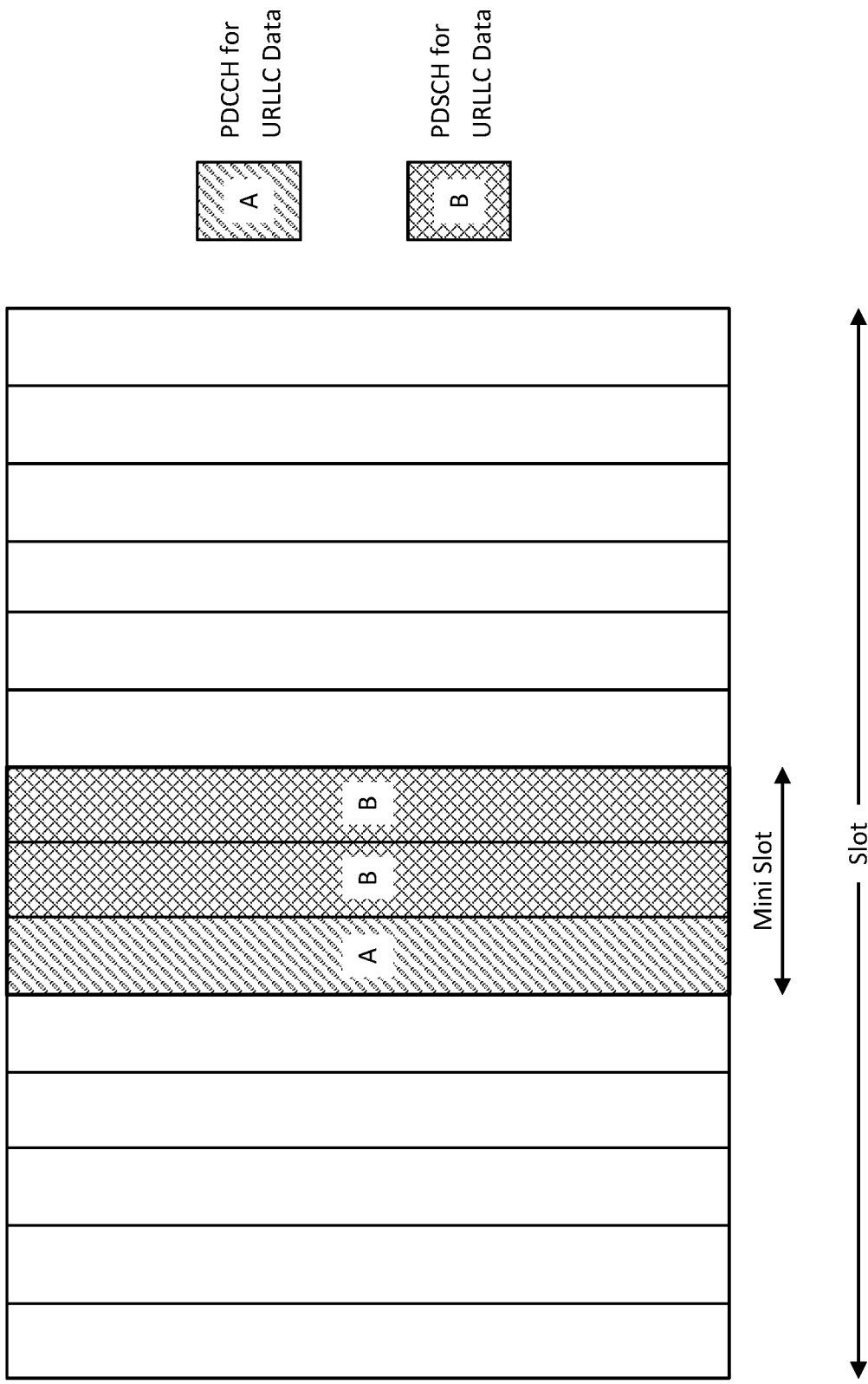
FIG. 11 illustrates an example of URLLC data transmission using mini slot.

Mechanisms for time and frequency tracking for URLLC data and may be used. In NR, mini slot may be widely used and may only span a few symbols, for example, 2 or 3 symbols. For example, URLLC data may require very low transmission latency. The URLLC may be scheduled with a mini slot length of 3 symbols, as shown in FIG. 11.

To demodulate the PDSCH, a UE may need fine time and frequency synchronization. However, because three or more symbols time-spacing may be needed for TRS to guarantee the frequency tracking, the mini slot may not have enough symbols to schedule a self-contained UE-specific TRS. Therefore, a process is introduced for time and frequency tracing for URLLC.

The gNB may transmit the URLLC data using lower QAM. Lower QAM may require lower accuracy of frequency tracking. The UE may get enough time and frequency synchronization through one or more SS blocks or some self-contained TRS with fewer symbol spacing.

The gNB may schedule periodic TRS in the slot for the URLLC UE to be able to perform time and frequency tracking regardless of whether URLLC data is transmitted. The UE may track the periodic TRS to perform synchronization. When a URLLC data may be received, the UE may be well synchronized and ready for demodulation.

The gNB may schedule aperiodic TRS associated with each URLLC data. The TRS may be allocated inside and outside the mini slot containing the URLLC data to ensure the TRS has adequate time spacing. The location of the TRS may have at least the following alternatives. For example, within the mini slot, the TRS symbol may be allocated in both the PDCCH symbols and PDSCH symbols. The PDCCH and PDSCH REs may be rate-matched around the TRS REs. In another example, the TRS symbol may be allocated in a symbol outside the mini slot, for example, before the mini slot and/or after the mini slot.

FIGS. 12A-D illustrate examples of possible locations of the TRS. The configuration of the TRS for URLLC may be indicated to a UE in the following ways. The configuration of TRS for URLLC may be fixed and predefined, and no additional signaling may be needed. The configuration of TRS for URLLC may be dynamically indicated to the UE through the DCI carried on the PDCCH for URLLC within the mini slot.

Figure 12B:
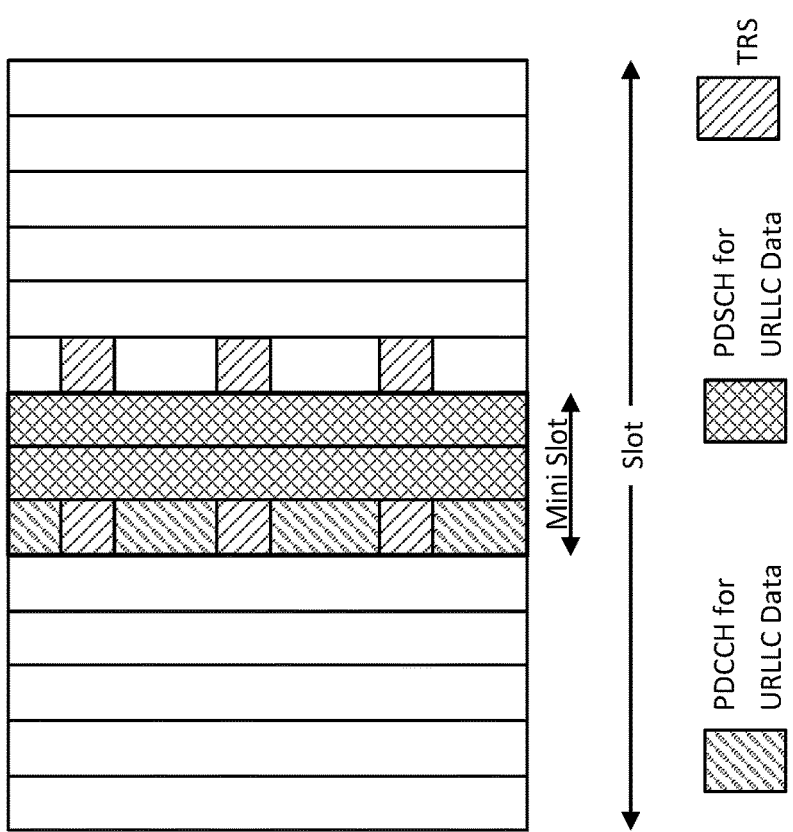
FIGS. 12A-D illustrate examples of TRS locations for URLLC data.
Figure 12A:
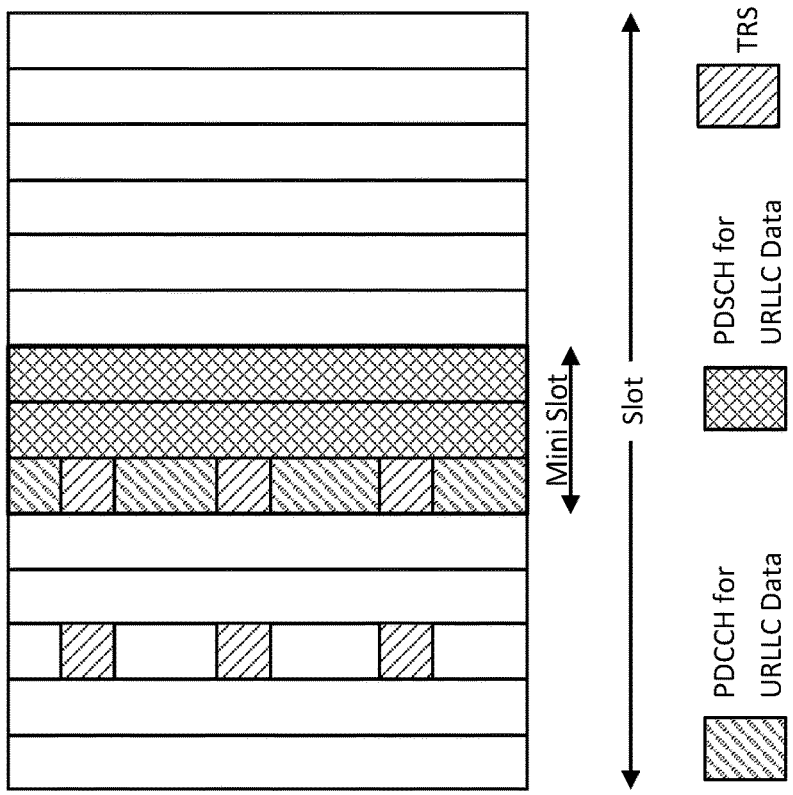
Figure 12D:
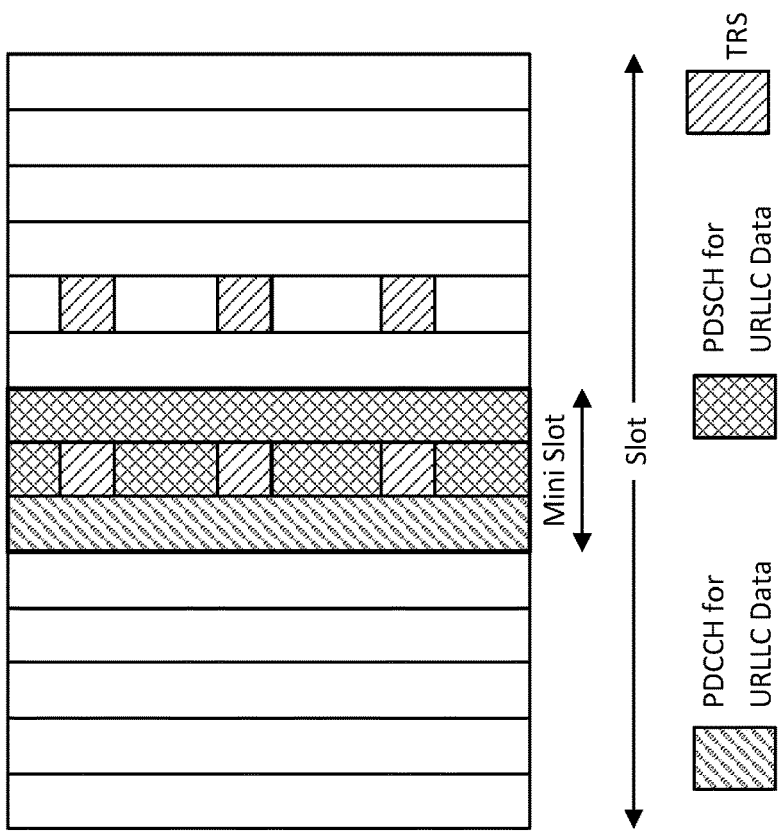
Figure 12C:
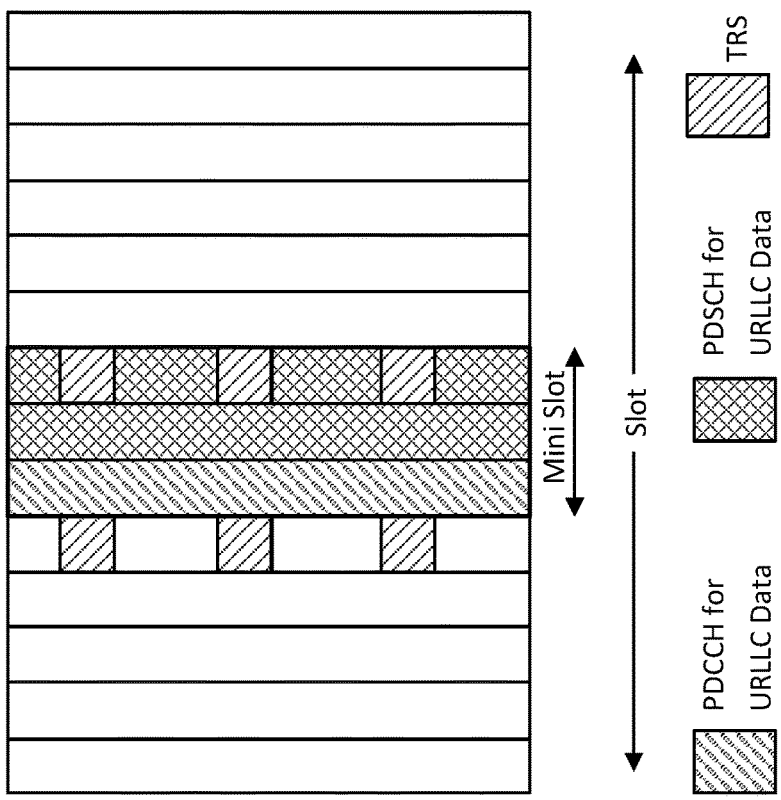

FIG. 12A illustrates a TRS located before the mini slot and in the PDCCH symbol within the mini slot. FIG. 12B illustrates a TRS located in the PDCCH symbol within the mini slot and after the mini slot. FIG. 12C illustrates a TRS located before the mini slot and in the PDSCH symbol within the mini slot. FIG. 12D illustrates a TRS located in the PDSCH symbol within the mini slot and after the mini slot.

It should be appreciated that because the TRS may be transmitted outside the mini slot, the TRS may collide with other RS, share channel, or control channel. For example, collision may occur between the TRS for URLLC UE1 and the RS/PDSCH/PDCCH for UE 2. In such an example, to ensure the receiving of URLLC data, the RS/PDSCH/PDCCH for UE 2 may perform rate matching around the TRS for URLLC or be punctured by the TRS for URLLC.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, for example, indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (for example, broadband access in dense areas, indoor ultra-high broadband access, broadband access in a crowd, 50+ Mbps everywhere, ultra-low cost broadband access, mobile broadband in vehicles), critical communications, massive machine type communications, network operation (for example, network slicing, routing, migration and interworking, energy savings), and enhanced vehicle-to-everything (eV2X) communications. Specific service and applications in these categories include, for example, monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 13A:
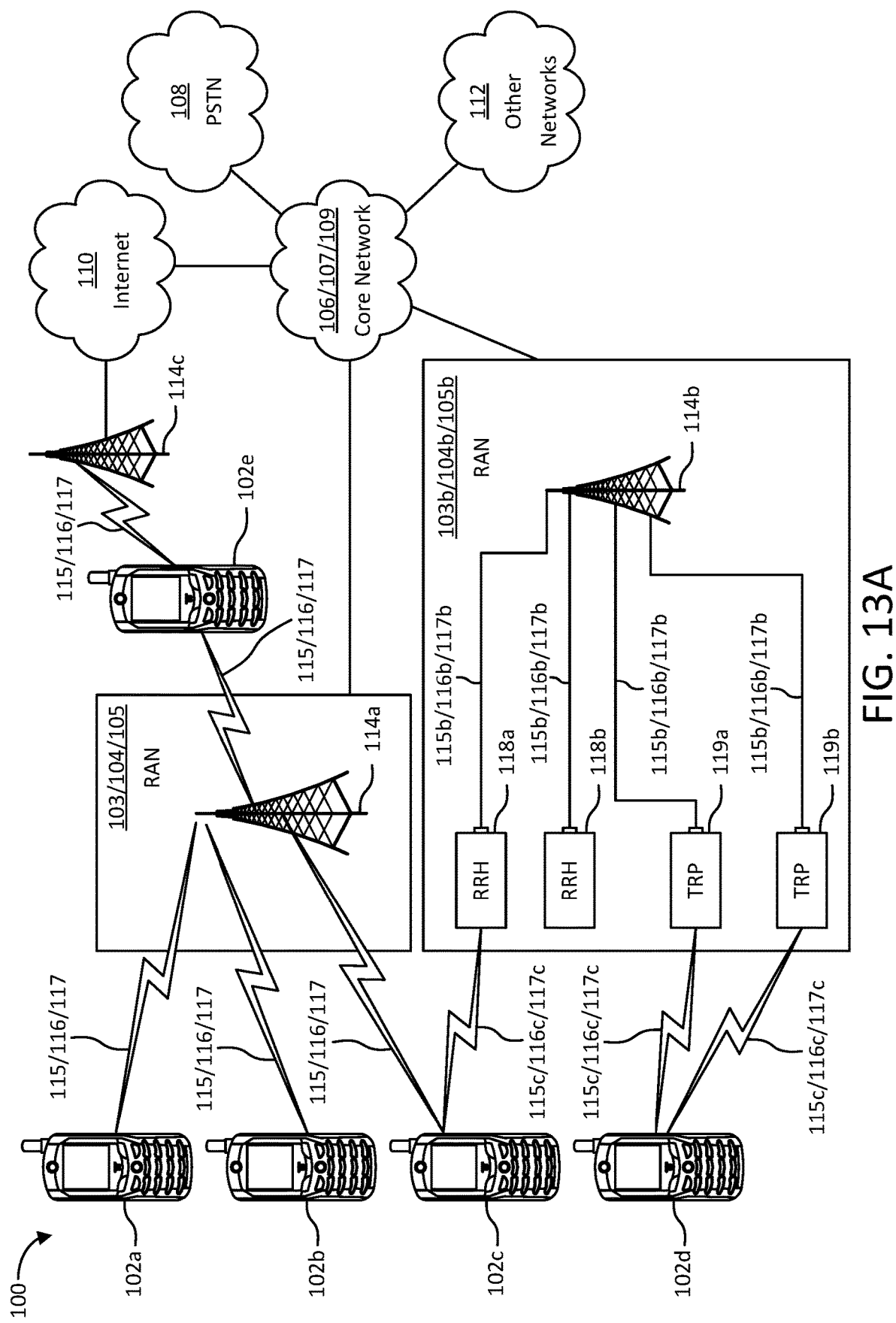
FIG. 13A illustrates an example communications system in which the methods and apparatuses described and claimed herein may be embodied.

FIG. 13A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 13A-13E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, for example, one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (for example, radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (for example, cable, optical fiber, etc.) or wireless communication link (for example, radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (for example, radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UNITS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+).

HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UNITS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (for example, Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (for example, WCDMA, CDMA2000, GSM, LTE, LTE-A, etc.) to establish a picocell or femtocell. As shown in FIG. 13A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 13A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, for example, the WTRUs 102a, 102b, 102c, 102d, and 102e may include multiple transceivers for communicating with different wireless networks over different wireless links. For example, the WTRU 102e shown in FIG. 13A may be configured to communicate with the base station 114a, which may employ a cellular-based radio technology, and with the base station 114c, which may employ an IEEE 802 radio technology.

Figure 13B:
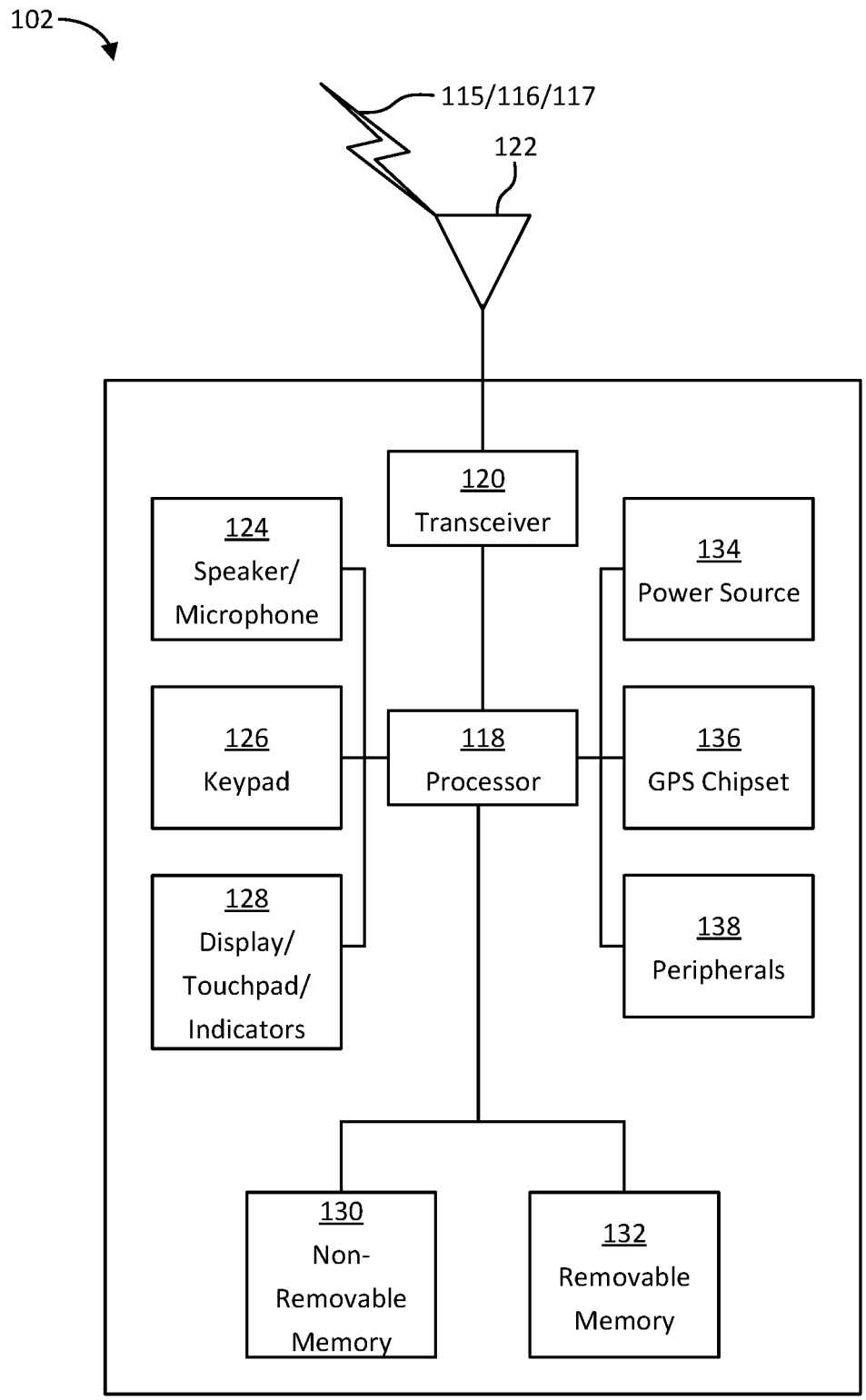
FIG. 13B is a block diagram of an example apparatus or device configured for wireless communications.

FIG. 13B is a block diagram of an example apparatus or device configured for wireless communications in accordance with the embodiments illustrated herein, such as for example, a WTRU 102. As shown in FIG. 13B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in an embodiment, the WTRU 102 may include two or more transmit/receive elements 122 (for example, multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (for example, a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 115/116/117 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (for example, finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 13C:
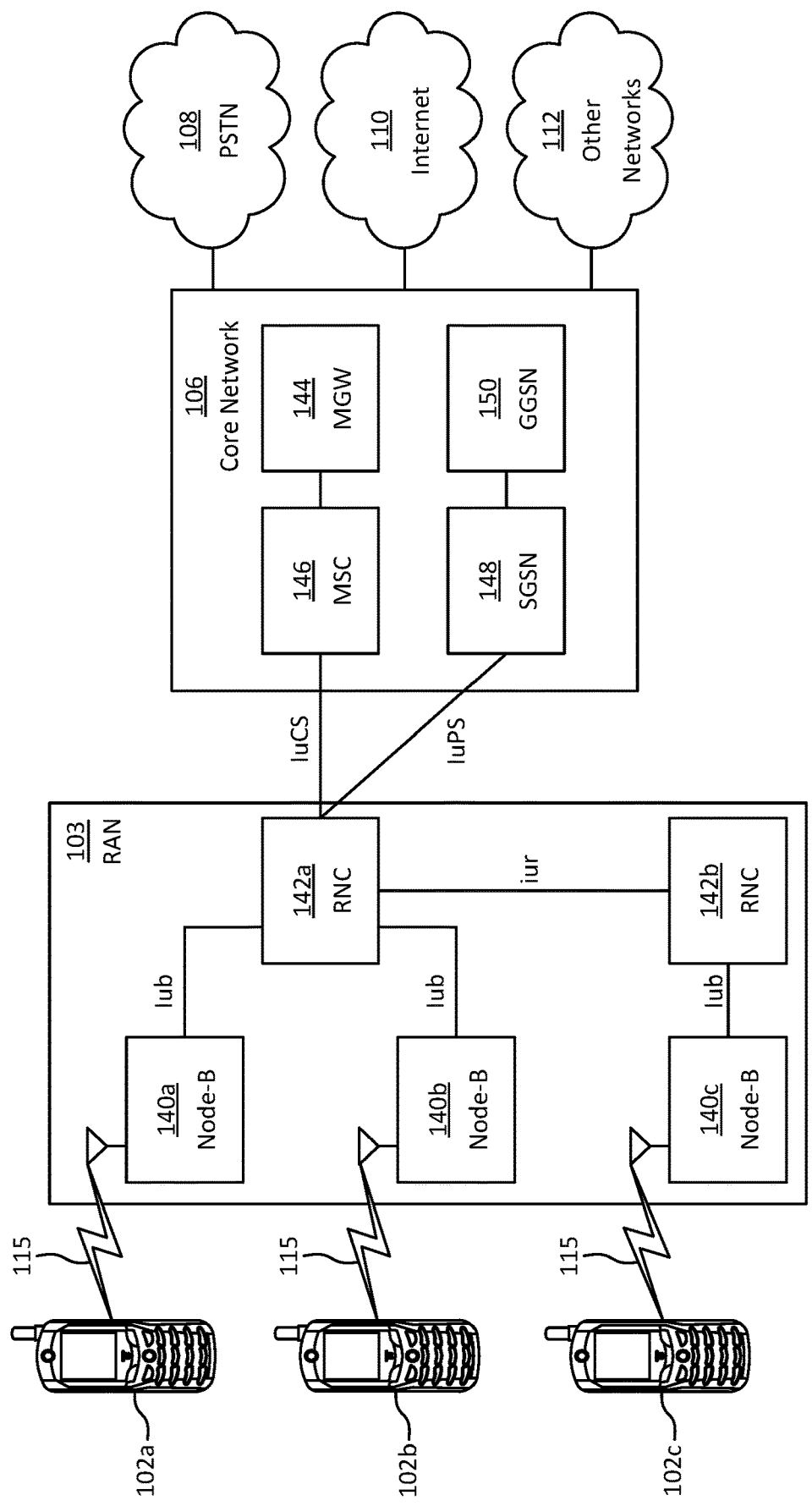
FIG. 13C is a system diagram of an example radio access network (RAN) and core network.

FIG. 13C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, and 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
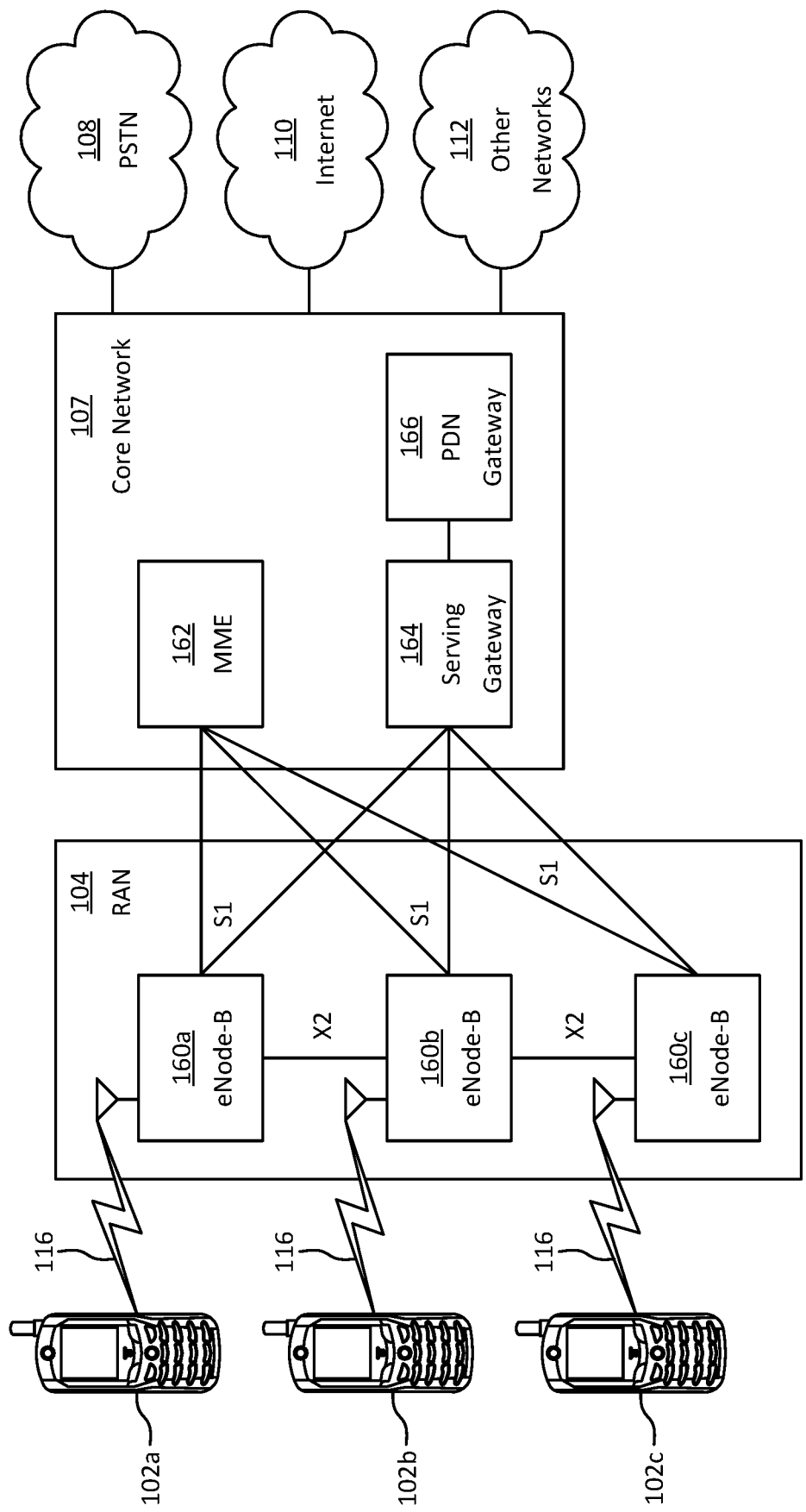
FIG. 13D is a system diagram of a RAN and core network.

FIG. 13D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c, and traditional land-line communications devices. For example, the core network 107 may include, or may communicate with, an IP gateway (for example, an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
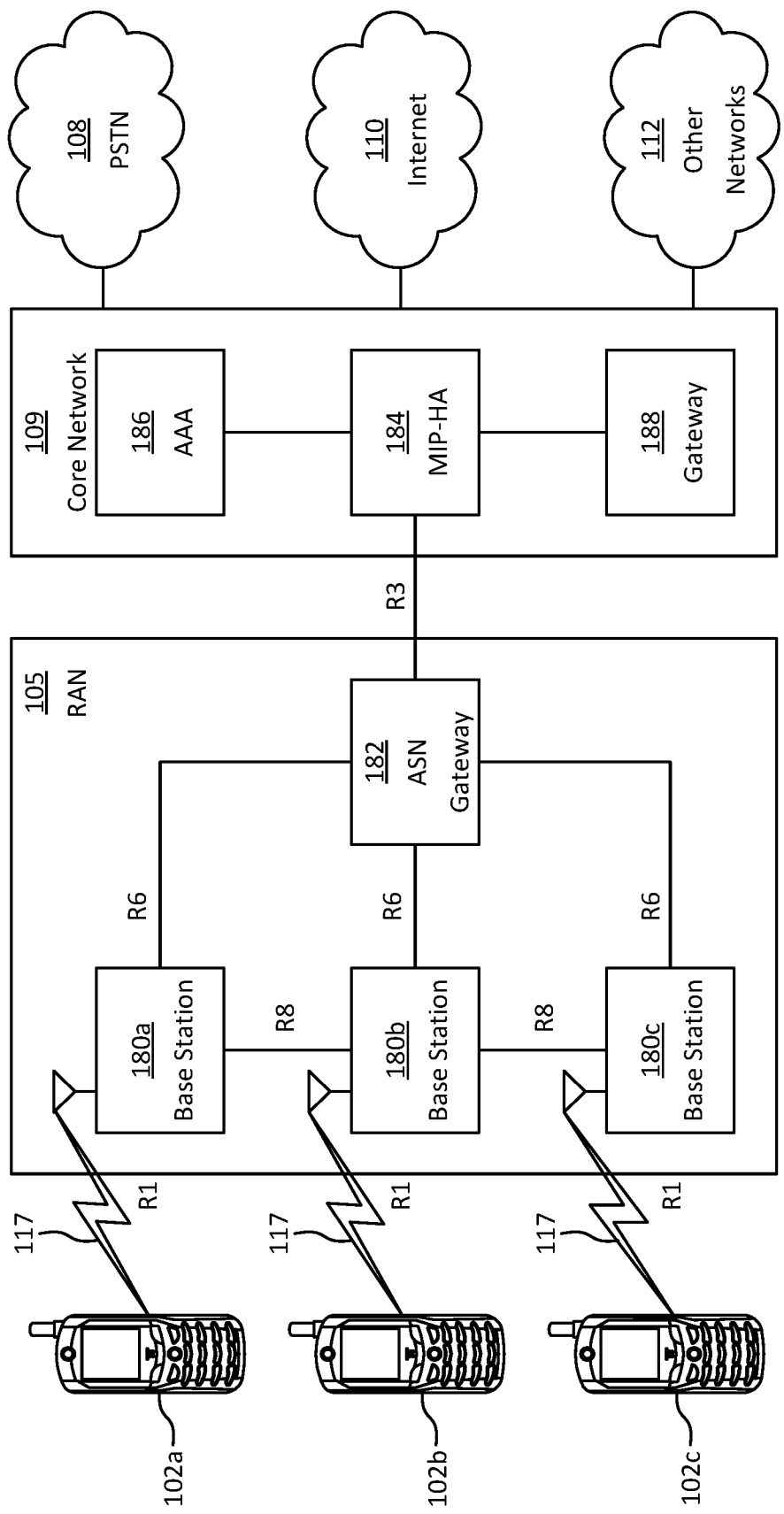
FIG. 13E is a system diagram of a RAN and core network.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, and 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 13A, 13C, 13D, and 13E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 13A, 13B, 13C, 13D, and 13E are provided by way of example only, and it is understood that the subject matter disclosed and claimed herein may be embodied or implemented in any similar communication system, whether presently defined or defined in the future.

Figure 13F:
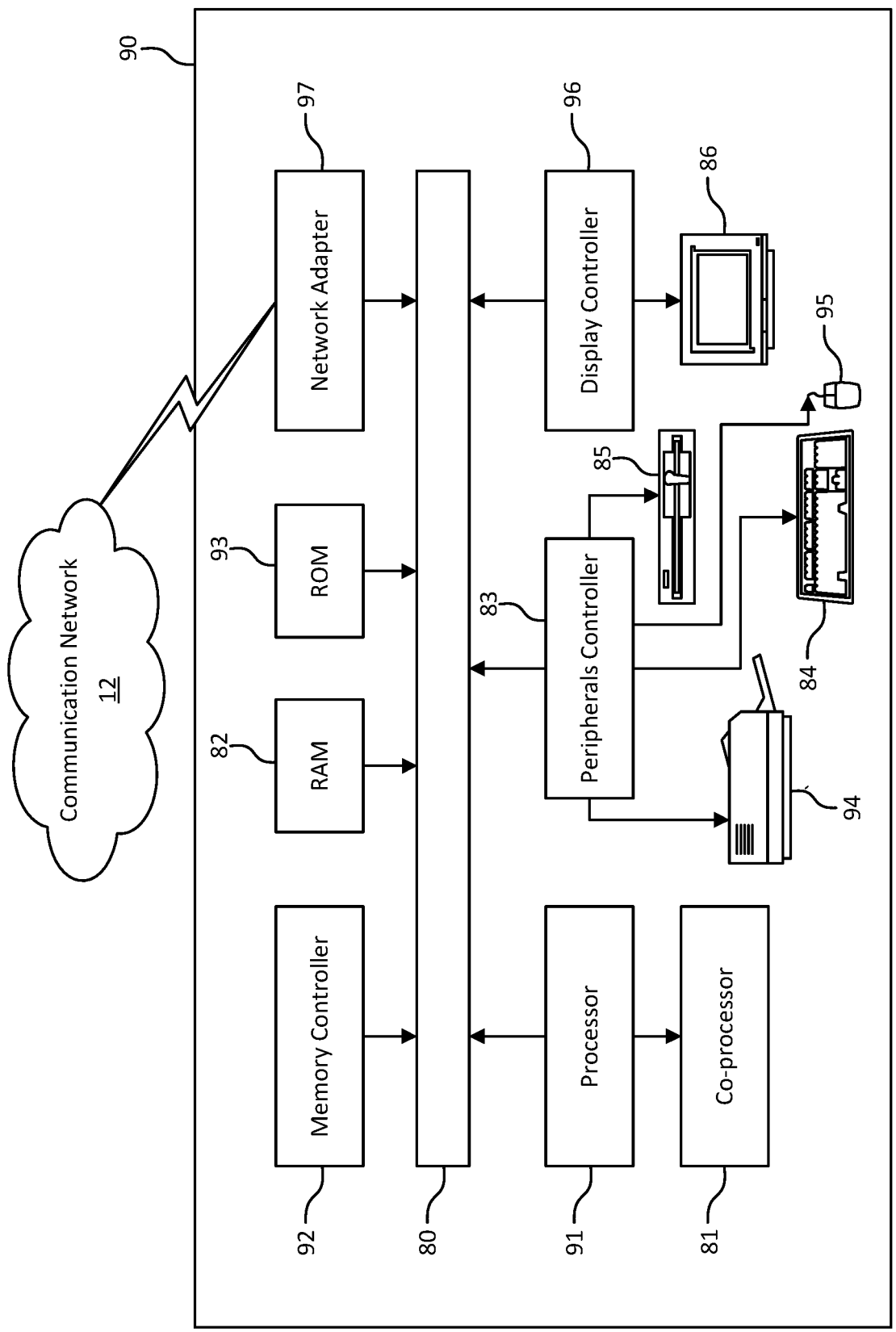
FIG. 13F is a block diagram of an exemplary computing system 90 in which one or more apparatuses of the communications networks illustrated in FIGS. 13A, 13C, 13D and 13E may be embodied.

FIG. 13F is a block diagram of an exemplary computing system 90 in which one or more apparatuses of the communications networks illustrated in FIGS. 13A, 13C, 13D and 13E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 13A, 13B, 13C, 13D, and 13E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (for example, program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and non-volatile, removable and non-removable media implemented in any non-transitory (for example, tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The invention claimed is:

1. A wireless transmit/receive unit (WTRU) comprising a processor and memory storing instructions which, when executed by the processor, cause the WTRU to perform operations comprising:
receiving a tracking reference signal comprising resources located in one or more slots, wherein the resources are located in one or more symbols used for receiving a demodulation reference signal, and
wherein the one or more symbols in which the resources of the tracking reference signal are located are within a first five symbols in each of the one or more slots.

2. The WTRU of claim 1, wherein at least one resource of the tracking reference signal is multiplexed with the demodulation reference signal.

3. The WTRU of claim 1, wherein at least one resource of the tracking reference signal is multiplexed with one or more resources of a control resource set.

4. The WTRU of claim 1, wherein:
a first symbol in which resources of the tracking reference signal are located is located within a symbol carrying at least one resource of a control resource set; and
a second symbol in which the resources of the tracking reference signal are located is located within a symbol carrying the demodulation reference signal.

5. The WTRU of claim 1, wherein the one or more symbols in which the resources of the tracking reference signal are located in a first slot are repeated in a second slot.

6. The WTRU of claim 1, wherein the instructions, when executed by the processor, further cause the WTRU to receive a configuration associated with the tracking reference signal dynamically in a downlink control information in a physical downlink control channel.

7. The WTRU of claim 6, wherein the configuration associated with the tracking reference signal is received in an aperiodic reference signal.

8. The WTRU of claim 1, wherein the instructions, when executed, further cause the WTRU to receive a tracking reference signal sequence, wherein the tracking reference signal sequence is generated based on a pseudo-noise sequence generation having an initializer that is a function of a WTRU-specific identifier and a symbol index.

9. The WTRU of claim 1, wherein the instructions, when executed, further cause the WTRU to receive a configuration associated with the tracking reference signal via radio resource control (RRC) signaling.

10. A wireless transmit/receive unit (WTRU) comprising a processor and memory storing instructions which, when executed by the processor, cause the WTRU to perform operations comprising:
receiving a tracking reference signal comprising resources located in one or more slots, wherein the resources are located in one or more symbols used for receiving a demodulation reference signal, and
wherein at least one resource of the received tracking reference signal is frequency multiplexed with the demodulation reference signal.

11. The WTRU of claim 10, wherein at least one resource of the tracking reference signal is frequency multiplexed with one or more resources of a control resource set.

12. The WTRU of claim 10, wherein:
a first symbol in which resources of the tracking reference signal are located is located within a symbol carrying at least one resource of a control resource set; and
a second symbol in which the resources of the tracking reference signal are located is located within a symbol carrying the demodulation reference signal.

13. The WTRU of claim 10, wherein the one or more symbols in which the resources of the tracking reference signal are located in a first slot are repeated in a second slot.

14. The WTRU of claim 10, wherein the instructions, when executed by the processor, further cause the WTRU to receive a configuration associated with the tracking reference signal dynamically in a downlink control information in a physical downlink control channel.

15. The WTRU of claim 14, wherein the configuration associated with the tracking reference signal is received in an aperiodic reference signal.

16. The WTRU of claim 10, wherein the instructions, when executed, further cause the WTRU to receive a tracking reference signal sequence, wherein the tracking reference signal sequence is generated based on a pseudo-noise sequence generation having an initializer that is a function of a WTRU-specific identifier and a symbol index.

17. The WTRU of claim 10, wherein the instructions, when executed, further cause the WTRU to receive a configuration associated with the tracking reference signal via radio resource control (RRC) signaling.

* * * * *